United States Patent
Chuang et al.

(10) Patent No.: US 10,904,565 B2
(45) Date of Patent: Jan. 26, 2021

(54) MEMORY-BANDWIDTH-EFFICIENT DESIGN FOR BI-DIRECTIONAL OPTICAL FLOW (BIO)

(71) Applicant: QUALCOMM Incorporated, San Diego, CA (US)

(72) Inventors: Hsiao-Chiang Chuang, San Diego, CA (US); Jianle Chen, San Diego, CA (US); Kai Zhang, San Diego, CA (US); Xiang Li, San Diego, CA (US); Marta Karczewicz, San Diego, CA (US); Yi-Wen Chen, San Diego, CA (US); Wei-Jung Chien, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 16/015,046

(22) Filed: Jun. 21, 2018

(65) Prior Publication Data

US 2018/0376166 A1 Dec. 27, 2018

Related U.S. Application Data

(60) Provisional application No. 62/524,398, filed on Jun. 23, 2017.

(51) Int. Cl.
*H04N 19/577* (2014.01)
*H04N 19/82* (2014.01)
(Continued)

(52) U.S. Cl.
CPC ......... *H04N 19/577* (2014.11); *H04N 19/105* (2014.11); *H04N 19/159* (2014.11);
(Continued)

(58) Field of Classification Search
None
See application file for complete search history.

(56) References Cited

U.S. PATENT DOCUMENTS

| 2004/0062307 A1* | 4/2004 | Hallapuro | ............ | H04N 19/159 |
| | | | | 375/240.13 |
| 2006/0209963 A1* | 9/2006 | Valente | ................ | H04N 19/176 |
| | | | | 375/240.24 |

(Continued)

FOREIGN PATENT DOCUMENTS

WO 2017036399 A1 3/2017

OTHER PUBLICATIONS

Non-Final Rejection in U.S. Appl. No. 15/919,060, dated May 2, 2019, 9 pp.

(Continued)

*Primary Examiner* — Kate H Luo
(74) *Attorney, Agent, or Firm* — Shumaker & Sieffert, P.A.

(57) ABSTRACT

A device for decoding video data is configured to perform interpolation filtering using an N-tap filter to generate an interpolated search space for a first block of video data; obtain a first predictive block in the interpolated search space; determine that a second block of video data is encoded using a bi-directional inter prediction mode and a bi-directional optical flow (BIO) process; perform an inter prediction process for the second block of video data using the bi-directional inter prediction mode to determine a second predictive block; perform the BIO process on the second predictive block to determine a BIO-refined version of the second predictive block, wherein a number of reference samples used for calculating intermediate values for BIO offsets is limited to a region of $(W+N-1) \times (H+N-1)$ (Continued)

integer samples, wherein W and H correspond to a width and height of the second block in integer samples.

24 Claims, 27 Drawing Sheets

(51) Int. Cl.

| | |
|---|---|
| H04N 19/159 | (2014.01) |
| H04N 19/105 | (2014.01) |
| H04N 19/583 | (2014.01) |
| H04N 19/61 | (2014.01) |
| H04N 19/573 | (2014.01) |
| H04N 19/59 | (2014.01) |
| H04N 19/523 | (2014.01) |
| H04N 19/57 | (2014.01) |
| H04N 19/13 | (2014.01) |
| H04N 19/126 | (2014.01) |
| H04N 19/553 | (2014.01) |

(52) U.S. Cl.
CPC ........... *H04N 19/523* (2014.11); *H04N 19/57* (2014.11); *H04N 19/573* (2014.11); *H04N 19/583* (2014.11); *H04N 19/59* (2014.11); *H04N 19/61* (2014.11); *H04N 19/82* (2014.11); *H04N 19/126* (2014.11); *H04N 19/13* (2014.11); *H04N 19/553* (2014.11)

(56) References Cited

U.S. PATENT DOCUMENTS

| | | | | |
|---|---|---|---|---|
| 2012/0263235 | A1* | 10/2012 | Sugio | H04N 19/513 375/240.16 |
| 2018/0192071 | A1 | 7/2018 | Chuang et al. | |
| 2018/0249172 | A1* | 8/2018 | Chen | H04N 19/53 |

OTHER PUBLICATIONS

Response to the Office Action from U.S. Appl. No. 15/919,060 dated May 2, 2019, as filed Aug. 2, 2019, 13 pp.
ITU-T H.265, Series H: Audiovisual and Multimedia Systems, Infrastructure of audiovisual services—Coding of moving video, Advanced video coding for generic audiovisual services, the International Telecommunication Union. Apr. 2015, 634 pp.
Wang Y-K. et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
Chen J., et al., Algorithm Description of Joint Exploration Test Model 5 (JEM 5) Joint Video Exploration Team (JVET) of ITU-T SG 16 WP 3 and ISO/IEC JTC 1/SC 29/WG 11, 5th Meeting: Geneva, Jan. 12-20, 2017, JVET-E1001-v2, 44 pp.
Chen J., et al., "Algorithm Description of Joint Exploration Test Model 6 {JEM 6}," Joint Video Exploration Team (JVET) of ITU-T SG 16 WP 3 and ISO/IEC JTC 1/SC 29/WG 11, 6th Meeting; Hobart, AU, Mar. 31-Apr. 7, 2017, Document: JVET-F1001-v3, Jun. 30, 2017, 48 pp.
Chen et al., "Alogorithm Description of Joint Exploration Test Model 7 {JEM 7}," Joint Video Exploration Team (JVET) of ITU-T SG 16 WP 3 and ISO/IEC JTC 1/SC 29/WG11, 7th Meeting: Torino, IT< Jul. 13-21, 2017, JVET-G1001-v1, 50 pp.

ITU-T H.223, Series H: Audiovisual and Multimedia Systems "Multiplexing Protocol for Low Bit Rate Multimedia Communication," Jul. 2001, pp. 1-74.
Alshin A., et al., "EE3: Bi-directional Optical Flow w/o Block Extension," 5th JVET Meeting; Dec. 1, 2017-Jan. 20, 2017; Geneva; (The Joint Video Exploration Team of ISO/IEC JTC1/SC29/WG11 and ITU-T SG.16); URL: http://phenix.int-evry.fr/jvet/,,No. JVET-E0028, Jan. 3, 2017, XP030150490, 4 pp.
Alshin, et al., "EE3: BIO w/o block extension," Joint Video Exploration Team (JVET) of ITU-T SG 16 WP 3 and ISO/IEC JTC 1/SC 29/WG 11; 6th Meeting: Hebard, AU, Mar. 31-Apr. 7, 2017, JVET-F0028, Mar. 28, 2017, 4 pp.
Chuang et al., "A block-based design for Bi-directional optical flow (BIO)," Joint Video Exploration Team (JVET) of TU-T SG 16 WP 3 and ISO/IEC JTC 1/SC 29/WG 11; 6th Meeting; Mar. 13-Apr. 7, 2017, document No. JVET-F0022, Mar. 15, 2017, 3 pp.
Alshin A., et al., "Bi-Directional Optical flow for Improving Motion Compensation," 2010 Picture Coding Symposium (PCS 2010): Nagoya, Japan, Dec. 8-10, 2010, Dec. 1, 2010 (Dec. 1, 2010), pp. 422-425, XP055324095, Piscataway, NJ, DOI: 10.1109/PCS.2010. 5702525, ISBN: 978-1-4244-7134-8.
Alshina E., et al., "Known Tools Performance Investigation for Next Generation Video Coding," 52nd Meeting, Jun. 19 through 26, 2015, Warsaw, Poland; ITU-Telecommunications Standardization Sector, Study Group 16 Question 6, Video Coding Experts Group (VCEG), VCEG-AZ05_r1, Jun. 25, 2015, 7 pp.
Sullivan, G.J., et al., "Overview of the High Efficiency Video Coding (HEVC) Standard," IEEE Transactions on Circuits and Systems for Video Technology, IEEE Service Center, Piscataway, NJ, US, vol. 22 (12), Dec. 1, 2012 (Dec. 1, 2012), pp. 1649-1668, XP011486324, ISSN: 1051-8215, DOI: 10.1109/TCSVT.2012. 2221191.
Tu S.-F., et al., "A Novel Framework for Frame Rate Up Conversion by Predictive Variable Block-Size Motion Estimated Optical Flow," International Congress on Image and Signal Processing (LISP), Oct. 2009, 5 pp.
Alshina E., et al., "Description of Exploration Experiments on Coding Tools," Joint Video Exploration Team (JVET) of ITU-T SG 16 WP 3 and ISO/IEC JTC 1/SC 29/WG 11; 6th Meeting: Hobard, AU, Mar. 31-Apr. 7, 2017, JVET-F1011, Apr. 29, 2017, 10 pp.
Alshina, "EE2 Cross-check for block-based BIO Design," Joint Video Exploration Team (JVET) of ITU-T SG 16 WP 3 and ISO/IEC JTC 1/SC 29/WG 11; 7th Meeting; Jul. 13-21, 2017, document No. JVET-G0116, Jul. 10, 2017, 4 pp.
Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
Chuang et al., "EE2: A block-based design for Bi-directional optical ftow (BIO)," Joint Video Exploration Team (JVET) of ITU-T SG 16 WP 3 and ISO/IEC JTC 1/SC 29/WG 11, 7th Meeting; Torino, IT; Jul. 13-21, 2017, JVET-G0082, Jul. 5, 2017, 6 pp.
ITU-T H.263 "Series H: Audiovisual and Multimedia Systems Infrastructure of audiovisual service-Coding of moving video: Video coding for low bitrate communication," (Jan. 2005), 226 pp.
Chen Y., et al., "Description of SDR, HDR and 360 Degree Video Coding Technology Proposal by Qualcomm and Technicolor-Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix_int-evry.fr/jvet/, pp. 1-43.
Bordes, et al., "Description of SDR, HDR and 360 video coding technology proposal by Qualcomm and Technicolor-medium complexity version," JVET-J0022r1, 10th Meeting; San Diego, US, Apr. 10-20, 2018, (The Joint Video Exploration Team of ISO/IEC JTC1/SC29/WG11 and ITU-T SG.16); 84 pp.
Chuang, et al., "EE2-related: A simplified gradient filter for Bi-directional optical flow (BIO)," Joint Video Exploration Team (JVET) of ITU-T SG 16 WP 3 and ISO/IEC JTC 1/SC 29/WG 11; 7th Meeting; Jul. 13-21, 2017, document No. JVET-G0083, Jul. 14, 2017, 5 pp.
U.S. Appl. No. 15/919,060, filed by Hsiao-Chiang Chuang et al., filed Mar. 12, 2018.

(56) References Cited

OTHER PUBLICATIONS

International Search Report and Written Opinion—PCT/US2018/039065—ISA/EPO—dated Sep. 20, 2018.
Leontaris A., et al., "Multiple Reference Motion Compensation: A Tutorial Introduction and Survey", Foundations and Trends in Signal Processing vol. 2, No. 4, 2008, pp. 247-364.

* cited by examiner

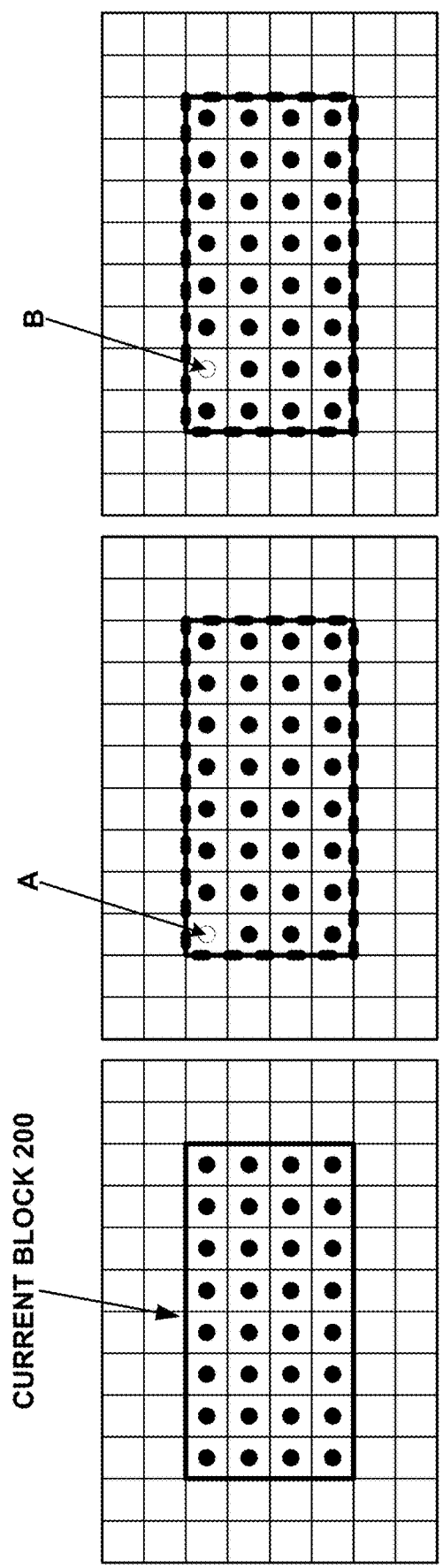

MEMORY-BANDWIDTH-EFFICIENT DESIGN FOR BI-DIRECTIONAL OPTICAL FLOW (BIO)

This Application claims the benefit of U.S. Provisional Patent Application 62/524,398, filed 23 Jun. 2017, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs), and/or coding nodes. Video blocks in an intra-coded (I) slice of a picture may be encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, the techniques of this disclosure are related to improvements of bi-directional optical flow (BIO) video coding techniques. More specifically, the techniques of this disclosure are related to inter prediction and motion vector reconstruction of BIO for video coding and to inter prediction refinement based on the BIO.

According to one example, a method of decoding video data includes determining that a first block of video data is encoded using an inter prediction mode; performing interpolation filtering using an N-tap filter to generate an interpolated search space, wherein N is an integer and corresponds to a number of taps in the N-tap filter; obtaining a first predictive block for the first block of video data in the interpolated search space; determining that a second block of video data is encoded using a bi-directional inter prediction mode; determining that the second block of video data is encoded using a bi-directional optical flow (BIO) process; performing an inter prediction process for the second block of video data using the bi-directional inter prediction mode to determine a second predictive block; performing the BIO process on the second predictive block to determine a BIO-refined version of the second predictive block, wherein a number of reference samples used for calculating intermediate values for BIO offsets is limited to a region of $(W+N-1)\times(H+N-1)$ integer samples, wherein W corresponds to a width of the second block in integer samples, and H corresponds to a height of the second block in integer samples; and outputting the BIO-refined version of the second predictive block.

According to another example, a device for decoding video data includes a memory configured to store the video data and one or more processors configured to determine that a first block of video data is encoded using an inter prediction mode; perform interpolation filtering using an N-tap filter to generate an interpolated search space, wherein N is an integer and corresponds to a number of taps in the N-tap filter; obtain a first predictive block for the first block of video data in the interpolated search space; determine that a second block of video data is encoded using a bi-directional inter prediction mode; determine that the second block of video data is encoded using a bi-directional optical flow (BIO) process; perform an inter prediction process for the second block of video data using the bi-directional inter prediction mode to determine a second predictive block; perform the BIO process on the second predictive block to determine a BIO-refined version of the second predictive block, wherein a number of reference samples used for calculating intermediate values for BIO offsets is limited to a region of $(W+N-1)\times(H+N-1)$ integer samples, wherein W corresponds to a width of the second block in integer samples, and H corresponds to a height of the second block in integer samples; and output the BIO-refined version of the second predictive block.

According to another example, a computer-readable storage medium stores instructions that when executed by one or more processors cause the one or more processors to determine that a first block of video data is encoded using an inter prediction mode; perform interpolation filtering using an N-tap filter to generate an interpolated search space, wherein N is an integer and corresponds to a number of taps in the N-tap filter; obtain a first predictive block for the first block of video data in the interpolated search space; determine that a second block of video data is encoded using a bi-directional inter prediction mode; determine that the second block of video data is encoded using a bi-directional optical flow (BIO) process; perform an inter prediction process for the second block of video data using the bi-directional inter prediction mode to determine a second predictive block; perform the BIO process on the second predictive block to determine a BIO-refined version of the second predictive block, wherein a number of reference samples used for calculating intermediate values for BIO offsets is limited to a region of (W+N−1)×(H+N−1) integer samples, wherein W corresponds to a width of the second block in integer samples, and H corresponds to a height of the second block in integer samples; and output the BIO-refined version of the second predictive block.

According to another example, a device for decoding video data includes means for determining that a first block of video data is encoded using an inter prediction mode; means for performing interpolation filtering using an N-tap filter to generate an interpolated search space, wherein N is an integer and corresponds to a number of taps in the N-tap filter; means for obtaining a first predictive block for the first block of video data in the interpolated search space; means for determining that a second block of video data is encoded using a bi-directional inter prediction mode; means for determining that the second block of video data is encoded using a bi-directional optical flow (BIO) process; means for performing an inter prediction process for the second block of video data using the bi-directional inter prediction mode to determine a second predictive block; means for performing the BIO process on the second predictive block to determine a BIO-refined version of the second predictive block, wherein a number of reference samples used for calculating intermediate values for BIO offsets is limited to a region of (W+N−1)×(H+N−1) integer samples, wherein W corresponds to a width of the second block in integer samples, H corresponds to a height of the second block in integer samples; and means for outputting the BIO-refined version of the second predictive block.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 6 shows an example of modified BIO for an 8×4 block.

DETAILED DESCRIPTION

Figure 1:
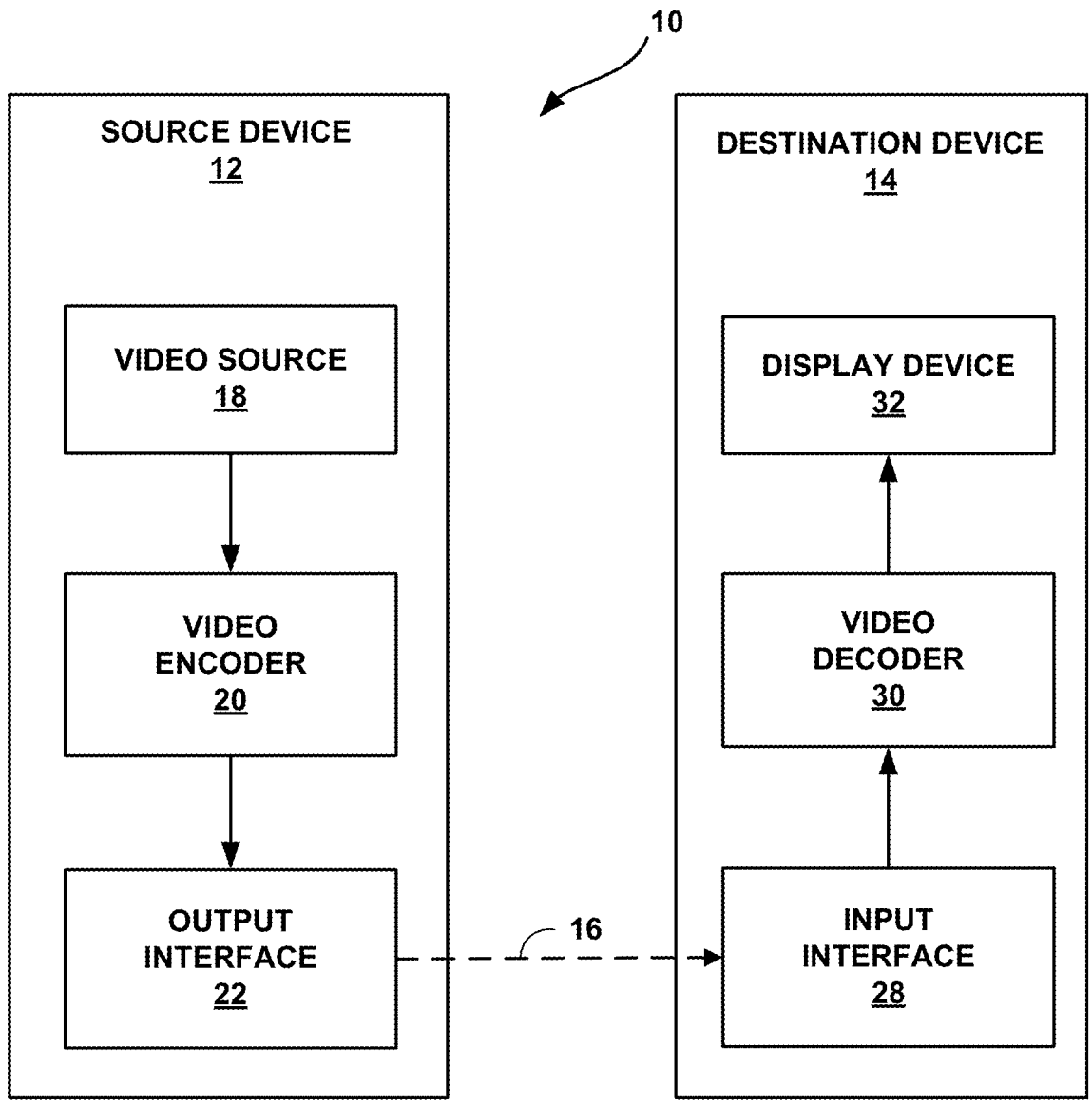
FIG. 1 is a block diagram illustrating an example video encoding and decoding system that may utilize techniques for bi-directional optical flow (BIO).

In general, the techniques of this disclosure are related to improvements of bi-directional optical flow (BIO) video coding techniques. More specifically, the techniques of this disclosure are related to inter prediction and motion vector reconstruction of BIO for video coding and to inter prediction refinement based on the BIO. BIO may be applied during motion compensation. In general, BIO is used to modify a motion vector on a per-pixel basis for a current block, such that pixels of the current block are predicted using corresponding offset values applied to the motion vector. The various techniques of this disclosure may be applied, alone or in any combination, to determine when and whether to perform BIO when predicting blocks of video data, e.g., during motion compensation. In one example, the techniques of this disclosure include performing BIO when motion vectors used to inter-predict a block of video data of a current picture relative to reference blocks of reference pictures in a common prediction direction are in proportion to, or almost in in proportion to, temporal distances between the current picture and the reference pictures, and to avoid performing BIO otherwise. In some examples, BIO may be performed only when the block is not in a region of illumination change. Furthermore, the techniques by which BIO are performed generally include calculating gradients for the blocks. In accordance with the techniques of this disclosure, the gradients may be modified according to the temporal distances between the current picture and the reference pictures.

The techniques of this disclosure may be applied to any existing video codec, such as those conforming to ITU-T H.264/AVC (Advanced Video Coding) or High Efficiency Video Coding (HEVC), also referred to as ITU-T H.265. H.264 is described in International Telecommunication Union, "Advanced video coding for generic audiovisual services," SERIES H: AUDIOVISUAL AND MULTIMEDIA SYSTEMS, Infrastructure of audiovisual services—Coding of moving video, H.264, June 2011, and H.265 is described in International Telecommunication Union, "High efficiency video coding," SERIES H: AUDIOVISUAL AND MULTIMEDIA SYSTEMS, Infrastructure of audiovisual services—Coding of moving video, April 2015. The techniques of this disclosure may also be applied to any other previous or future video coding standards as an efficient coding tool.

An overview of HEVC is described in G. J. Sullivan, J. -R. Ohm, W. -J. Han, T. Wiegand "Overview of the High Efficiency Video Coding (HEVC) Standard," IEEE Transactions on Circuits and Systems for Video Technology, vol. 22, no.12. pp. 1649-1668, December 2012. The latest HEVC draft specification is available at http://phenix.int-evry.fr/jct/ doc_end_user/documents/14_Vienna/wg11/JCTVC-N1003-v1.zip. The latest version of the Final Draft of International Standard (FDIS) of HEVC is described in JCTVC-L1003_v34, available at http://phenix.it-sudparis.eu/jct/doc_end_user/documents/12_Geneva/wg11/JCTVC-L1003-v34.zip Other video coding standards include ITU-T H.261, ISO/IEC MPEG-1 Visual, ITU-T H.262 or ISO/IEC MPEG-2 Visual, ITU-T H.263, ISO/IEC MPEG-4 Visual and the Scalable Video Coding (SVC) and Multiview Video Coding (MVC) extensions of H.264, as well as the extensions of HEVC, such as the range extension, multiview extension (MV-HEVC) and scalable extension (SHVC). In April 2015, the Video Coding Experts Group (VCEG) started a new research project which targets a next generation of video coding standard. The reference software is called HM-KTA.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (WET) to evaluate compression technology designs proposed by their experts in this area.

The JVET first met during 19-21 Oct. 2015. One version of the JVET reference software, including an algorithm description, is set forth in the document Joint Exploration Model 5 (JEM 5), J. Chen, E. Alshina, G. J. Sullivan, J. -R. Ohm, J. Boyce, "Algorithm Description of Joint Exploration Test Model 5 (JEM 5)", JVET-E1001, January 2017. Another version of the JVET reference software is described in the document Joint Exploration Model 6 (Jem 6), J. Chen, E. Alshina, G. J. Sullivan, J. -R. Ohm, J. Boyce, "Algorithm description of Joint Exploration Test Model 6 (JEM 6)", JVET-F1001, April 2017. Another version of the JVET reference software is described in the document Joint Exploration Model 7 (JEM 7), J. Chen, E. Alshina, G. J. Sullivan, J. -R. Ohm, J. Boyce, "Algorithm description of Joint Exploration Test Model 7 (JEM 7)", JVET-G1001, July 2017.

Certain techniques of this disclosure may be described with reference to H.264 and/or HEVC to aid in understanding, but the techniques describe are not limited to H.264 or HEVC and can be used in conjunction with other coding standards and other coding tools.

The following discussion relates to motion information. In general, a picture is divided into blocks, each of which may be predictively coded. Prediction of a current block can generally be performed using intra-prediction techniques (using data from the picture including the current block) or inter-prediction techniques (using data from a previously coded picture relative to the picture including the current block). Inter-prediction can be uni-directional prediction or bi-directional prediction.

For each inter-predicted block, a set of motion information may be available. A set of motion information may contain motion information for forward and/or backward prediction directions. Here, forward and backward prediction directions are two prediction directions of a bi-directional prediction mode. The terms "forward" and "backward" do not necessarily have a geometry meaning. Instead, the terms "forward" and "backward" generally correspond to whether the reference pictures are to be displayed before ("backward") or after ("forward") the current picture. In some examples, "forward" and "backward" prediction directions may correspond to reference picture list 0 (RefPicList0) and reference picture list 1 (RefPicList1) of a current picture. When only one reference picture list is available for a picture or slice, only RefPicList0 may be available and the motion information of each block of a slice can refer to a picture of RefPicList0 (e.g., after the current picture).

In some cases, a motion vector together with its reference index is used in a decoding process. Such a motion vector with its associated reference index is denoted as a uni-predictive set of motion information.

For each prediction direction, the motion information contains a reference index and a motion vector. In some cases, for simplicity, a motion vector itself may be referred to in a way that it is assumed that the motion vector has an associated reference index. A reference index may be used to identify a reference picture in the current reference picture list (e.g., RefPicList0 or RefPicList1). A motion vector has a horizontal (x) and a vertical (y) component. In general, the horizontal component indicates a horizontal displacement within a reference picture, relative to the position of a current block in a current picture, used to locate an x-coordinate of a reference block, while the vertical component indicates a vertical displacement within the reference picture, relative to the position of the current block, used to locate a y-coordinate of the reference block.

Picture order count (POC) values are used in video coding standards to identify a display order of a picture. Although there are cases in which two pictures within one coded video sequence may have the same POC value, this typically does not happen within a coded video sequence. Thus, POC values of pictures are generally unique, and thus can uniquely identify corresponding pictures. When multiple coded video sequences are present in a bitstream, pictures having the same POC value may be closer to each other in terms of decoding order. POC values of pictures are typically used for reference picture list construction, derivation of reference picture sets as in HEVC, and motion vector scaling.

E. Alshina, A. Alshin, J. -H. Min, K. Choi, A. Saxena, M. Budagavi, "Known tools performance investigation for next generation video coding," ITU—Telecommunications Standardization Sector, STUDY GROUP 16 Question 6, Video Coding Experts Group (VCEG), VCEG-AZ05, June. 2015, Warsaw, Poland (hereinafter, "Alshina 1"), and A. Alshina, E. Alshina, T. Lee, "Bi-directional optical flow for improving motion compensation," Picture Coding Symposium (PCS), Nagoya, Japan, 2010 (hereinafter, "Alshina 2") described BIO. BIO is based on pixel level optical flow. According to Alshina 1 and Alshina 2, BIO is only applied to blocks that have both forward and backward prediction. BIO as described in Alshina 1 and Alshina 2 is summarized below:

Given a pixel value $I_t$ at time t, its first order Taylor expansion is $$I_t = I_{t0} + \frac{\partial I_{t0}}{\partial t}(t - t0) \qquad (A)$$

$I_{t0}$ is on the motion trajectory of $I_t$. That is, the motion from $I_{t0}$ to $I_t$ is considered in the formula.

Under the assumption of optical flow:

$$0 = \frac{dI}{dt} = \frac{\partial I}{\partial t} + \frac{\partial I}{\partial x} \cdot \frac{\partial x}{\partial t} + \frac{\partial I}{\partial y} \cdot \frac{\partial y}{\partial t}$$

-continued $$\frac{\partial I}{\partial t} = -\frac{\partial I}{\partial x} \cdot \frac{\partial x}{\partial t} - \frac{\partial I}{\partial y} \cdot \frac{\partial y}{\partial t}$$

le $$G_x = \frac{\partial I}{\partial x},$$

$$G_y = \frac{\partial I}{\partial y} \text{ (gradient)},$$

and equation (A) becomes $$I_t = I_{t0} - G_{x0} \cdot \frac{\partial x}{\partial t} \cdot (t - t_0) - G_{y0} \cdot \frac{\partial y}{\partial t} \cdot (t - t_0) \quad (B)$$

Regarding $$\frac{\partial x}{\partial t} \text{ and } \frac{\partial y}{\partial t}$$

as the moving speed, $V_{x0}$ and $V_{y0}$ may be used to represent them.

So equation (B) becomes $$I_t = I_{t0} - G_{x0} \cdot V_{x0} \cdot (t - t_0) - G_{y0} \cdot V_{y0} \cdot (t - t_0) \quad (C)$$

Suppose, as an example, a forward reference at $t_0$ and a backward reference at $t_1$, and $$t_0 - t = t - t_1 = \Delta t = 1$$

This leads to:

$$I_t = I_{t0} - G_{x0} \cdot V_{x0} \cdot (t - t_0) - G_{y0} \cdot V_{y0} \cdot (t - t_0) = I_{t0} + G_{x0} \cdot V_{x0} + G_{y0} \cdot V_{y0}$$

$$I_t = I_{t1} - G_{x1} \cdot V_{x1} (t - t_1) - G_{y1} \cdot V_{y1} \cdot (t - t_1) = \quad (D)$$

$$I_{t1} - G_{x1} \cdot V_{x1} - G_{y1} \cdot V_{y1}$$

$$I_t = \frac{I_{t0} + I_{t1}}{2} + \frac{(G_{x0} \cdot V_{x0} - G_{x1} \cdot V_{x1}) + (G_{y0} \cdot V_{y0} - G_{y1} \cdot V_{y1})}{2}$$

It is further assumed $V_{x0} = V_{x1} = V_x$ and $V_{y0} = V_{y1} = V_y$ since the motion is along the trajectory. So equation (D) becomes $$I_t = \frac{I_{t0} + I_{t1}}{2} + \frac{(G_{x0} - G_{x1}) \cdot V_x + (G_{y0} - G_{y1}) \cdot V_y}{2} = \quad (E)$$

$$\frac{I_{t0} + I_{t1}}{2} + \frac{\Delta G_x \cdot V_x + \Delta G_y \cdot V_y}{2}$$

where $\Delta G_x = G_{x0} - G_{x1}$, $\Delta G_y = G_{y0} - G_{y1}$ can be calculated based on reconstructed references. Since $$\frac{I_{t0} + I_{t1}}{2}$$

is the regular bi-prediction, $$\frac{\Delta G_x \cdot V_x + \Delta G_y \cdot V_y}{2}$$

is called BIO offset hereafter for convenience.

$V_x$ and $V_y$ are derived at both encoder and decoder by minimizing the following distortion:

$$\min\left\{\sum_{block} ((I_{t0} + G_{x0} \cdot V_x + G_{y0} \cdot V_y) - (I_{t1} - G_{x1} \cdot V_x - G_{y1} \cdot V_y))^2\right\} =$$

$$\min\left\{\sum_{block} (\Delta I + (G_{x0} + G_{x1}) \cdot V_x + (G_{y0} + G_{y1} \cdot V_y))^2\right\}$$

With derived $V_x$ and $V_y$, the final prediction of the block is calculated with (E). $V_x$ and $V_y$ is called "BIO motion" for convenience.

In general, a video coder (e.g., video encoder and/or video decoder) performs BIO during motion compensation. That is, after the video coder determines a motion vector for a current block, the video coder produces a predicted block for the current block using motion compensation with respect to the motion vector. In general, the motion vector identifies the location of a reference block with respect to the current block in a reference picture. When performing BIO, a video coder modifies the motion vector on a per-pixel basis for the current block. That is, rather than retrieving each pixel of the reference block as a block unit, according to BIO, the video coder determines per-pixel modifications to the motion vector for the current block, and constructs the reference block such that the reference block includes reference pixels identified by the motion vector and the per-pixel modification for the corresponding pixel of the current block. Thus, BIO may be used to produce a more accurate reference block for the current block.

FIG. 1 is a block diagram illustrating an example video encoding and decoding system 10 that may utilize techniques for bi-directional optical flow. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may be any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may be any type of medium or device capable of moving the encoded video data from source device 12 to destination device 14. In one example, computer-readable medium 16 may be a communication medium to enable source device 12 to transmit encoded video data directly to destination device 14 in real-time. The encoded video data may be modulated according to a communication standard, such as a wireless communication protocol, and transmitted to destination device 14. The communication medium may be any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for bi-directional optical flow. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for bi-directional optical flow may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of the video data. Display device 32 displays the decoded video data to a user, and may be any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the HEVC standard introduced above, also referred to as ITU-T H.265. In some examples, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may include a coding tree block of luma samples, two corresponding coding tree blocks of chroma samples, and syntax structures used to code the samples of the coding tree blocks. In monochrome pictures or pictures having three separate color planes, a CTU may include a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

A CTB contains a quad-tree the nodes of which are coding units. The size of a CTB can be ranges from 16×16 to 64×64 in the HEVC main profile (although technically 8×8 CTB sizes can be supported). In some examples, a coding unit (CU) could be the same size as a CTB and as small as 8×8. Each coding unit can be coded with one mode. When a CU is inter coded, the CU may be further partitioned into 2 or 4 prediction units (PUs) or become just one PU when further partition does not apply. When two PUs are present in one CU, the two PUs can each be, for example, half size rectangles or two rectangles with sizes of ¼ or ¾ the size of the CU.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may include a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may include a single coding block and syntax structures used to code the samples of the coding block.

Video encoder 20 may partition a coding block of a CU into one or more prediction blocks, also referred to as predictive blocks. A prediction block is a rectangular block of samples on which the same prediction is applied. A prediction unit (PU) of a CU may include a prediction block of luma samples, two corresponding prediction blocks of chroma samples, and syntax structures used to predict the prediction blocks. In monochrome pictures or pictures having three separate color planes, a PU may include a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU. When the CU is inter coded, one set of motion information may be present for each PU. In addition, each PU may be coded with a unique inter-prediction mode to derive the set of motion information.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular block of samples on which the same transform is applied. A transform unit (TU) of a CU may include a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may include a sequence of network abstraction layer (NAL) units. A NAL unit is a syntax structure containing an indication of the type of data in the NAL unit and bytes containing that data in the form of a raw byte sequence payload (RB SP) interspersed with emulation prevention bits. Each of the NAL units includes a NAL unit header and encapsulates a RB SP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In accordance with the techniques of this disclosure, video encoder 20 and/or video decoder 30 may further perform BIO techniques during motion compensation as discussed in greater detail below.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may include an integrated circuit, a microprocessor, and/or a wireless communication device, such as a cellular telephone.

Figure 2:
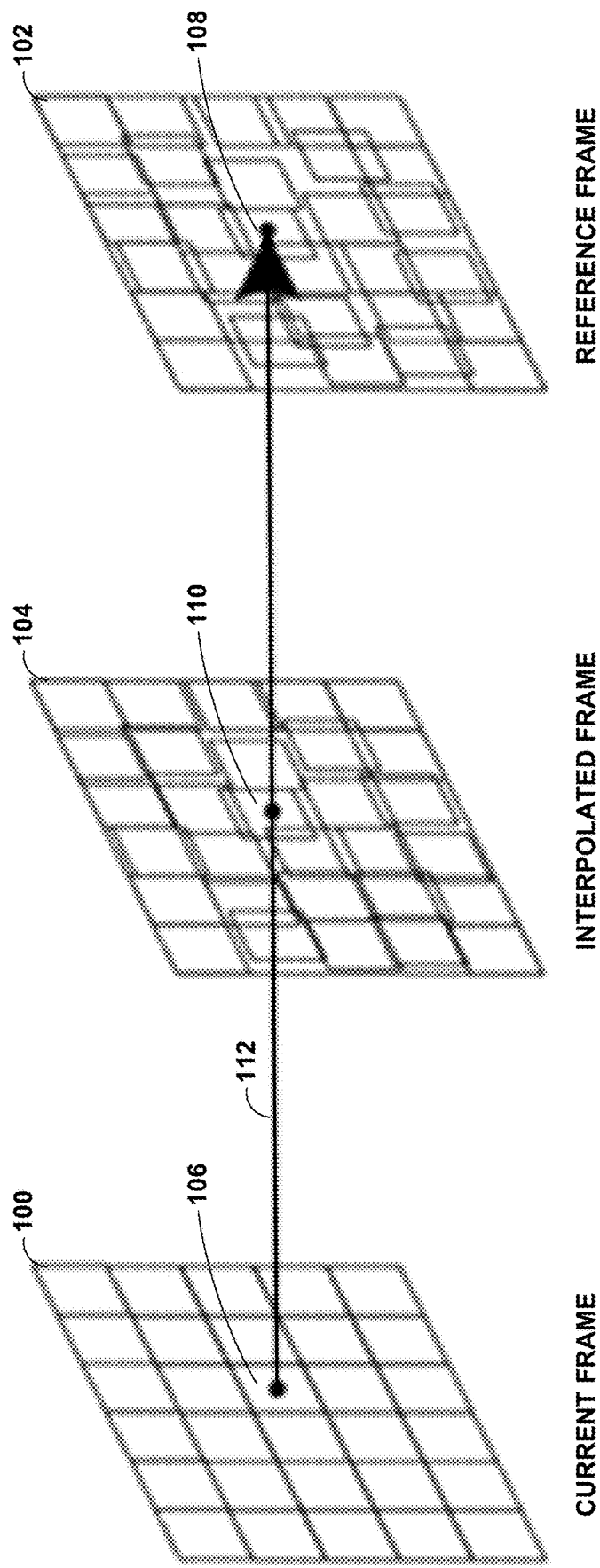
FIG. 2 is a conceptual diagram illustrating an example of unilateral motion estimation (ME) as a block-matching algorithm (BMA) performed for motion compensated frame-rate up-conversion (MC-FRUC).

FIG. 2 is a conceptual diagram illustrating an example of unilateral motion estimation (ME) as a block-matching algorithm (BMA) performed for motion compensated frame-rate up-conversion (MC-FRUC). In general, a video coder (such as video encoder 20 or video decoder 30) performs unilateral ME to obtain motion vectors (MVs), such as MV 112, by searching for the best matching block (e.g., reference block 108) from reference frame 102 for current block 106 of current frame 100. Then, the video coder interpolates an interpolated block 110 along the motion trajectory of motion vector 112 in interpolated frame 104. That is, in the example of FIG. 2, motion vector 112 passes through midpoints of current block 106, reference block 108, and interpolated block 110.

As shown in FIG. 2, three blocks in three frames are involved following the motion trajectory. Although current block 106 in current frame 100 belongs to a coded block, the best matching block in reference frame 102 (that is, reference block 108) need not fully belong to a coded block (that is, the best matching block might not fall on a coded block boundary, but instead, may overlap such a boundary). Likewise, interpolated block 110 in interpolated frame 104 need not fully belong to a coded block. Consequently, overlapped regions of the blocks and un-filled (holes) regions may occur in interpolated frame 104.

To handle overlaps, simple FRUC algorithms may simply involve averaging and overwriting the overlapped pixels. Moreover, holes may be covered by the pixel values from a reference or a current frame. However, these algorithms may result in blocking artifacts and blurring. Hence, motion field segmentation, successive extrapolation using the discrete Hartley transform, and image inpainting may be used to handle holes and overlaps without increasing blocking artifacts and blurring.

Figure 3:
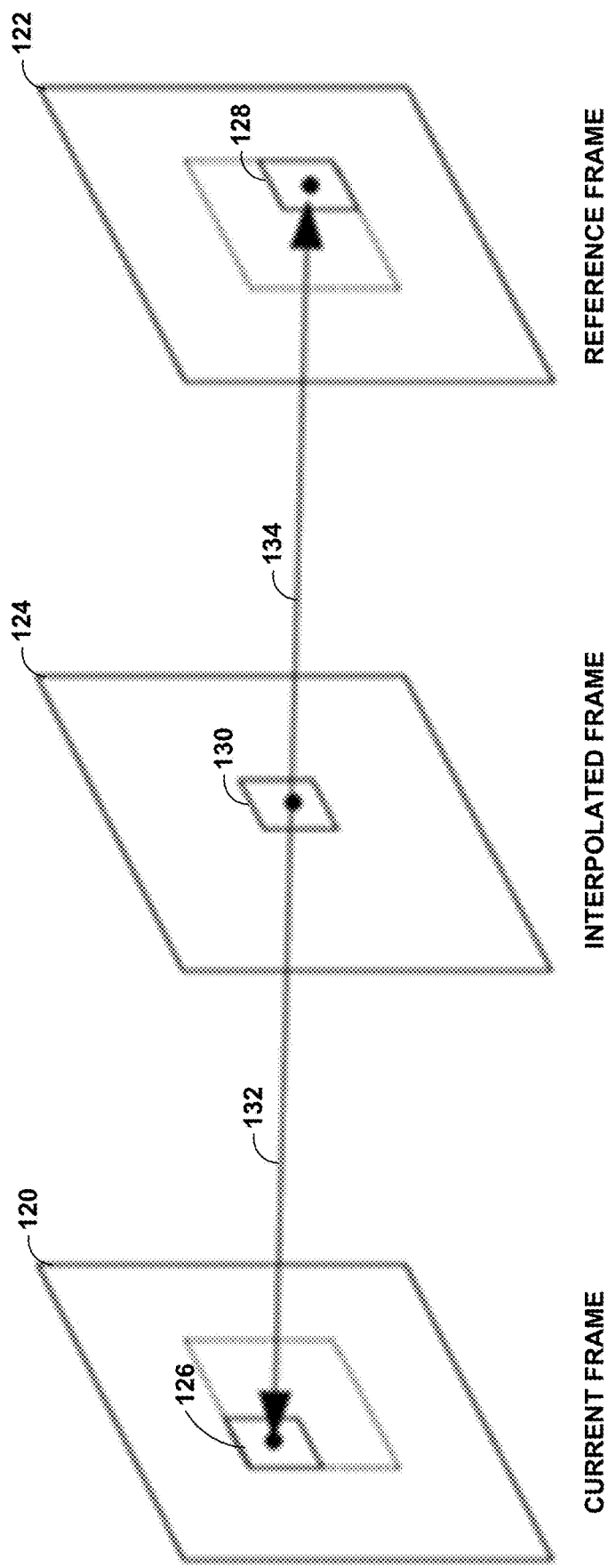
FIG. 3 is a conceptual diagram illustrating an example of bilateral ME as a BMA performed for MC-FRUC.

FIG. 3 is a conceptual diagram illustrating an example of bilateral ME as a BMA performed for MC-FRUC. Bilateral ME is another solution (in MC-FRUC) that can be used to avoid the problems caused by overlaps and holes. A video coder (such as video encoder 20 and/or video decoder 30) performing bilateral ME obtains MVs 132, 134 passing through interpolated block 130 of interpolated frame 124 (which is intermediate to current frame 120 and reference frame 122) using temporal symmetry between current block 126 of current frame 120 and reference block 128 of reference frame 122. As a result, the video coder does not generate overlaps and holes in interpolated frame 124. It can be assumed that current block 126 is a block that the video coder processes in a certain order, e.g., as in the case of video coding, a sequence of such blocks would cover the whole intermediate picture without overlap. For example, in the case of video coding, blocks can be processed in the decoding order. Therefore, such a method may be more suitable if FRUC ideas can be considered in a video coding framework.

In the HEVC standard, there are two inter prediction modes, named merge mode (with skip mode considered as a special case of merge) and advanced motion vector prediction (AMVP) mode respectively for a PU. In merge mode, a video encoder and a video decoder generate the same list of spatial, temporal, and artificially generated motion vector candidates, with each candidate including a motion vector and a reference picture index. For an inter-predicted block coded in merge mode, the video encoder includes an index of the candidate used to predict the block, and the video decoder decodes the block using the motion vector and reference picture index associated with the candidate identified by the index. In AMVP mode, a video encoder and a video decoder generate the same list of motion vector candidates, with each candidate including only a motion vector. For an inter-predicted block coded in AMVP mode, the video encoder includes an index of the candidate used to predict the block, a motion vector difference, and a reference picture index, and the video decoder decodes the block using the motion vector associated with the candidate identified by the index as a motion vector predictor. That is, the video decoder uses the motion vector predictor plus the motion vector difference to determine a motion vector for the block.

Figure 4:
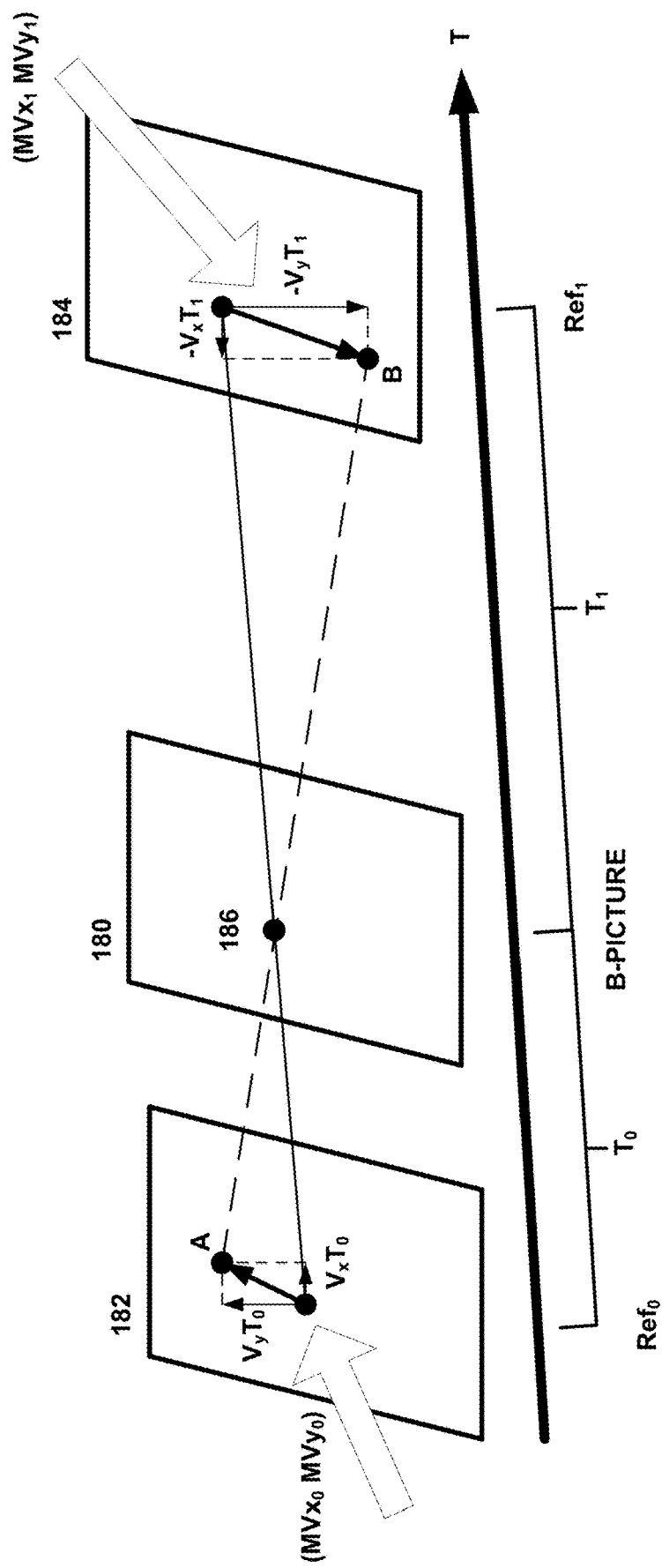
FIG. 4 shows an example of optical flow trajectory.

FIG. 4 shows an example of optical flow trajectory for BIO. In the example of FIG. 4, B-picture 180 is a bi-directional inter-predicted picture that is being predicted using reference picture 182 ($Ref_0$) and reference picture 184 ($Ref_1$). BIO utilizes pixel-wise motion refinement which is performed on top of block-wise motion compensation in the case of bi-prediction. As BIO compensates the fine motion inside the block, enabling BIO potentially results in enlarging the block size for motion compensation. Sample-level motion refinement does not require exhaustive search or signaling by using an explicit equation to give the fine motion vector for each sample.

$I^{(k)}$ represents a luminance value from reference k (k=0, 1) after motion compensation is performed for a bi-predicted block. $\partial I^{(k)}/\partial x$ and $\partial I^{(k)}/\partial y$ are the horizontal and vertical components of the $I^{(k)}$ gradient, respectively. Assuming the optical flow is valid, the motion vector field $(v_x, v_y)$ is given by the following equation:

$$\partial I^{(k)}/\partial t + v_x \partial I^{(k)}/\partial x + v_y \partial I^{(k)}/\partial y = 0. \quad (1)$$

Combining the optical flow equation with Hermite interpolation for motion trajectory of each sample one gets a unique polynomial of third order which matches both function values $I^{(k)}$ and derivatives $\partial I^{(k)}/\partial x$, $\partial I^{(k)}/\partial y$ at the ends. The value of this polynomial at t=0 is BIO prediction:

$$pred_{BIO} = \tfrac{1}{2} \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad (2)$$

In equation (2), $\tau_0$ and $\tau_1$ correspond to the distance to reference frames as shown is FIG. 4. Distances $\tau_0$ and $\tau_1$ are calculated based on POC values for Ref0 and Ref1: $\tau_0$=POC(current)−POC(Ref0), $\tau_1$=POC(Ref1)−POC(current). If both predictions come from the same time direction (both from the past or both from the future) then signs are different $\tau_0 \cdot \tau_1 < 0$. In this case BIO can be applied only if prediction is not from the same time moment ($\tau_0 \neq \tau_1$), both referenced regions have non-zero motion ($MVx_0, MVy_0, MVx_1, MVy_1 \neq 0$) and block motion vectors are proportional to the time distance ($MVx_0/MVx_1 = MVy_0/MVy_1 = -\tau_0/\tau_1$).

The motion vector field $(v_x, v_y)$ is determined by minimizing the difference $\Delta$ between values at points A and B, which corresponds to the intersection of motion trajectory and reference frame planes in FIG. 4. This intersection is shown as point 186 in FIG. 4. One model uses only the first linear term of local Taylor expansion for $\Delta$:

$$\Delta = (I^{(0)} - I^{(1)})_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \quad (3)$$

All values in equation (1) depend on sample location (i', j'), which was omitted so far. Assuming the motion is consistent in a local surrounding, the $\Delta$ inside (2M+1)×(2M+1) square window $\Omega$ centered in currently predicted point (i, j) may be minimized:

$$(v_x, v_y) = \underset{v_x, v_y}{\operatorname{argmin}} \sum_{[i', j'] \in \Omega} \Delta^2[i', y'] \quad (4)$$

For this optimization problem, a simplified solution making first minimization in vertical and then in horizontal directions may be used, which results in:

$$v_x = (s_1 + r) > m ? \operatorname{clip3}\left(-thBIO, thBIO, -\frac{s_3}{(s_1+r)}\right) : 0 \quad (5)$$

$$v_y = (s_5 + r) > m ? \operatorname{clip3}\left(-thBIO, thBIO, -\frac{s_6 - v_x s_2/2}{(s_5+r)}\right) : 0 \quad (6)$$

where, $$s_1 = \sum_{[i',j] \in \Omega} (\tau_1 \partial I^{(1)}/\partial x + \tau_0 \partial I^{(0)}/\partial x)^2; \quad (7)$$

$$s_3 = \sum_{[i',j] \in \Omega} (I^{(1)} - I^{(0)})(\tau_1 \partial I^{(1)}/\partial x + \tau_0 \partial I^{(0)}/\partial x);$$

$$s_2 = \sum_{[i',j] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j] \in \Omega} (\tau_1 \partial I^{(1)}/\partial y + \tau_0 \partial I^{(0)}/\partial y)^2;$$

$$s_6 = \sum_{[i',j] \in \Omega} (I^{(1)} - I^{(0)})(\tau_1 \partial I^{(1)}/\partial y + \tau_0 \partial I^{(0)}/\partial y)$$

In order to avoid division by zero or very small value, regularization parameters r and m are introduced in equations (2), (3).

$$r = 500 \cdot 4^{d-8} \quad (8)$$

$$m = 700 \cdot 4^{d-8} \quad (9)$$

Here d is the internal bit-depth of the input video.

In some cases, the MV refinement of BIO might be unreliable due to noise or irregular motion. Therefore, in BIO, the magnitude of MV regiment is clipped to the certain threshold thBIO. The threshold value is determined based on whether all the reference pictures of the current picture are all from one direction. If all the reference pictures of the current pictures of the current picture are from one direction, the value of the threshold is set to $12 \times 2^{14-d}$, otherwise, it is set to $12 \times 2^{13-d}$.

Gradients for BIO can be calculated at the same time with motion compensation interpolation using operations consistent with HEVC motion compensation process (2D separable FIR). The input for this 2D separable FIR is the same reference frame sample as for motion compensation process and fractional position (fraafracY) according to the fractional part of block motion vector. For horizontal gradient $\partial I/\partial x$, the signal is first interpolated vertically using the BIOfilterS corresponding to the fractional position fracY with de-scaling shift d−8, and then gradient filter BIOfilterG is applied in a horizontal direction corresponding to the fractional positionfracX with a de-scaling shift by 18−d. For vertical gradient $\partial I/\partial x$, the gradient filter is first applied vertically using the BIOfilterG corresponding to the fractional position fracY with de-scaling shift d−8, and then signal displacement is performed using BIOfilterS in a horizontal direction corresponding to the fractional positionfracXwith de-scaling shift by 18−d. The length of interpolation filter for gradients calculation BIOfilterG and signal displacement BIOfilterF may be shorter (6-tap) in order to maintain reasonable complexity. Table 1 shows the filters that can be used for gradients calculation for different fractional positions of block motion vector in BIO. Table 2 shows the interpolation filters that can be used for prediction signal generation in BIO.

Figure 5:
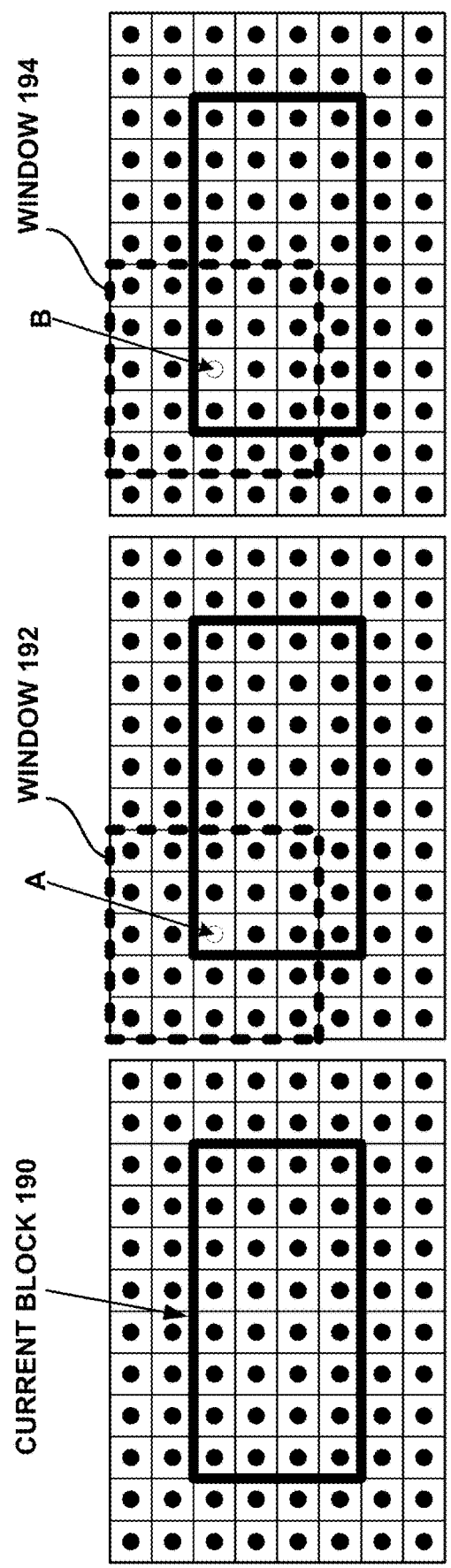
FIG. 5 shows an example of BIO for an 8×4 block.

FIG. 5 shows an example of the gradient calculation for an 8×4 block (shown as current block 190 in FIG. 5). For the 8×4 block, a video coder fetches the motion compensated predictors (also referred to as MC predictors) and calculates the HOR/VER gradients of the pixels within current block 190 as well as the outer two lines of pixels because solving vx and vy for each pixel uses the HOR/VER gradient values and motion compensated predictors of the pixels within the window Ω centered in each pixel, as shown in equation (4). In JEM, for example, the size of this window is set to 5×5, meaning a video coder fetches the motion compensated predictors and calculates the gradients for the outer two lines of pixels. Window 192 represents the 5×5 window centered at pixel A, and window 194 represents the 5×5 window centered at pixel B.

TABLE 1

Filters for gradients calculation in BIO

| Fractional pel position | Interpolation filter for gradient(BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {1, 4, −57, 57, −4, 1} |

TABLE 2

Interpolation filters for prediction signal generation in BIO

| Fractional pel position | Interpolation filter for prediction signal(BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {1, −7, 38, 38, −7, 1} |

In JEM, for example, BIO is applied to all bi-directional predicted blocks when the two predictions are from different reference pictures. When local illumination compensation (LIC) is enabled for a CU, BIO is disabled.

At the 5th JVET meeting, a proposal JVET-E0028, A. Alshin, E. Alshina, "EE3: bi-directional optical flow w/o block extension", JVET-E0028, January 2017, was submitted to modify the BIO operations and reduce the memory access bandwidth. In this proposal, no MC predictors and gradient values are needed for the pixels outside the current block. Moreover, the solving of $v_x$ and $v_y$ for each pixel is modified using the MC predictors and the gradient values of all the pixels within current block as shown in FIG. 5. In other words, the square window Ω in equation (4) is modified to a window which is equal to the current CU. A weighting factor w(i', j') is used for deriving vx and vy. The w(i', j') is a function of the position of the center pixel (i, j) and the positions of the pixels (i', j') within the window.

$$s_1 = \sum_{[i',j']\in\Omega} w(i', j')(\tau_1 \partial I^{(1)}/\partial x + \tau_0 \partial I^{(0)}/\partial x)^2; \quad (10)$$

$$s_3 = \sum_{[i',j']\in\Omega} w(i', j')(I^{(1)} - I^{(0)})(\tau_1 \partial I^{(1)}/\partial x + \tau_0 \partial I^{(0)}/\partial x);$$

$$s_2 = \sum_{[i',j']\in\Omega} w(i', j')$$

$$(\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j']\in\Omega} w(i', j')(\tau_1 \partial I^{(1)}/\partial y + \tau_0 \partial I^{(0)}/\partial y)^2;$$

$$s_6 = \sum_{[i',j']\in\Omega} w(i', j')(I^{(1)} - I^{(0)})(\tau_1 \partial I^{(1)}/\partial y + \tau_0 \partial I^{(0)}/\partial y)$$

FIG. 6 shows an example of modified BIO for an 8×4 block (shown as current block 200) according to techniques proposed in JVET-E0028. A simplified version of JVET-E0028 has been proposed to address the issue of mismatch in the outcomes between block-level and sub-block level BIO processes. Instead of using the neighborhood Ω with all pixels in a CU, the proposed method modifies the neighborhood Ω to include only 5×5 pixels centered at the current pixel without any interpolation or gradient calculation for pixel locations outside of the current CU.

Video encoder 20 and video decoder 30 may also perform Overlapped Block Motion Compensation (OBMC). The following description relates to OBMC as currently implemented in JEM, but video encoder 20 and video decoder 30 may also perform other types of OBMC. OBMC has been used for early generations of video standards, e.g., as in H.263. In JEM, OBMC is performed for all Motion Compensated (MC) block boundaries except the right and bottom boundaries of a CU. Moreover, OBMC is applied for both luma and chroma components. In JEM, a MC block corresponds to a coding block. When a CU is coded with sub-CU mode (including sub-CU merge, Affine, and FRUC mode), each sub-block of the CU is a MC block. To process CU boundaries in a uniform fashion, OBMC is performed at sub-block level for all MC block boundaries, where sub-block size is set equal to 4×4, as illustrated in FIGS. 7A and 7B.

When OBMC applies to the current sub-block, in addition to current motion vectors, motion vectors of four connected neighbouring sub-blocks, if available and not identical to the current motion vector, are also used to derive a predictive block for the current sub-block. These multiple prediction blocks based on multiple motion vectors are combined to generate the final prediction signal of the current sub-block.

In the following examples, a predictive block based on motion vectors of a neighbouring sub-block is denoted as $P_N$, with N indicating an index for the neighbouring above, below, left and right sub-blocks, and prediction block based on motion vectors of the current sub-block is denoted as $P_C$. When $P_N$ is based on the motion information of a neighbouring sub-block that contains the same motion information as a current sub-block, then OBMC is not performed for $P_N$. Otherwise, every pixel of $P_N$ is added to the co pixel in $P_C$, i.e., four rows/columns of $P_N$ are added to $P_C$. The weighting factors {1/4, 1/8, 1/16, 1/32} are used for $P_N$ and the weighting factors {3/4, 7/8, 15/16, 31/32} are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors {¼, ⅛} are used for $P_N$ and weighting factors {¾, ⅞} are used for $P_C$. For a $P_N$ generated based on motion vectors of a vertically neighbouring sub-block, pixels in the same row of $P_N$ are added to $P_C$ with a same weighting factor. For a $P_N$ generated based on motion vectors of a horizontally neighbouring sub-block, pixels in the same column of $P_N$ are added to $P_C$ with a same weighting factor. It is noted that BIO may also be applied for the derivation of the final prediction block.

Figure 7A:
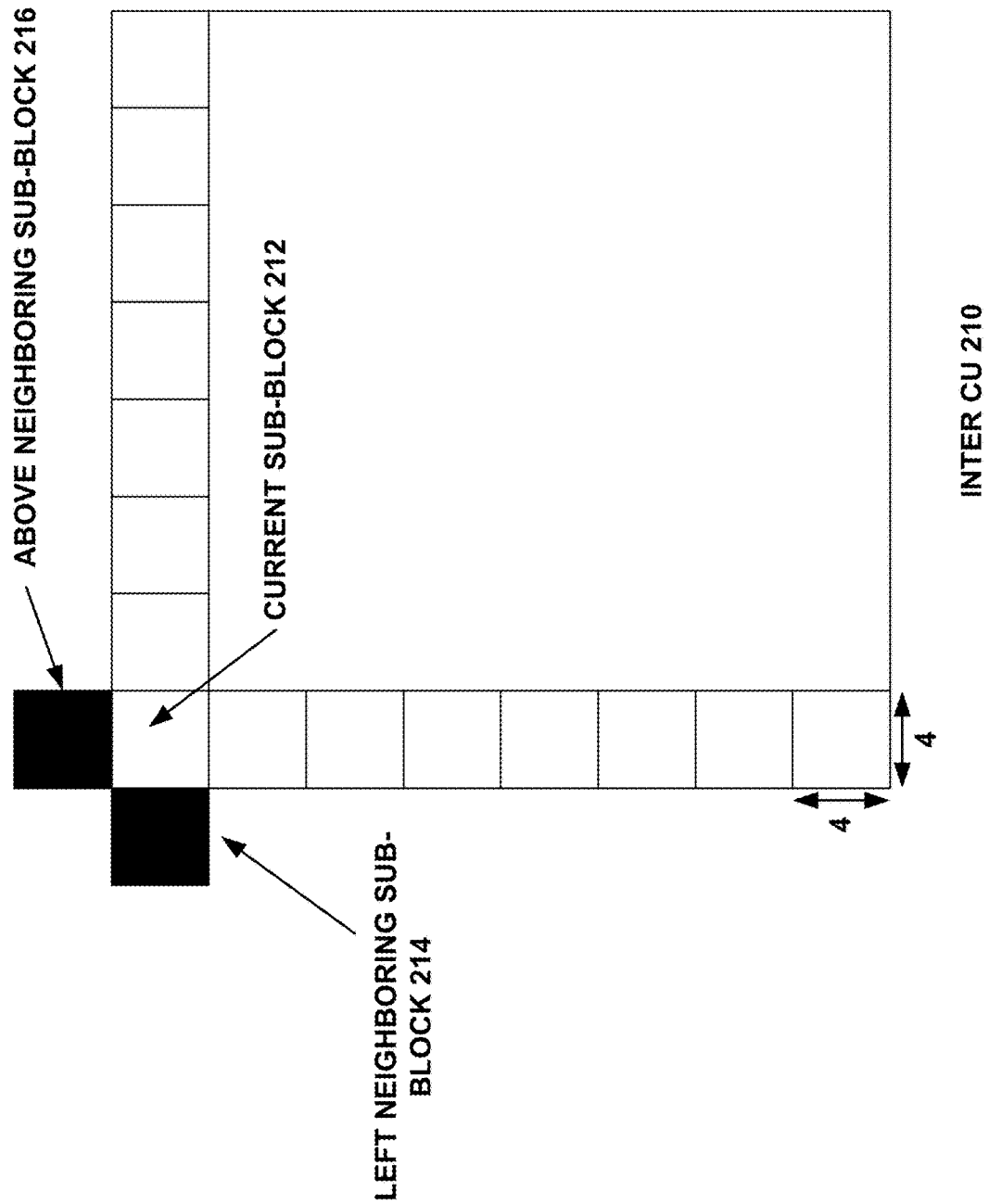
FIGS. 7A and 7B show examples of sub-blocks where Overlapped Block Motion Compensation (OBMC) applies.
Figure 7B:
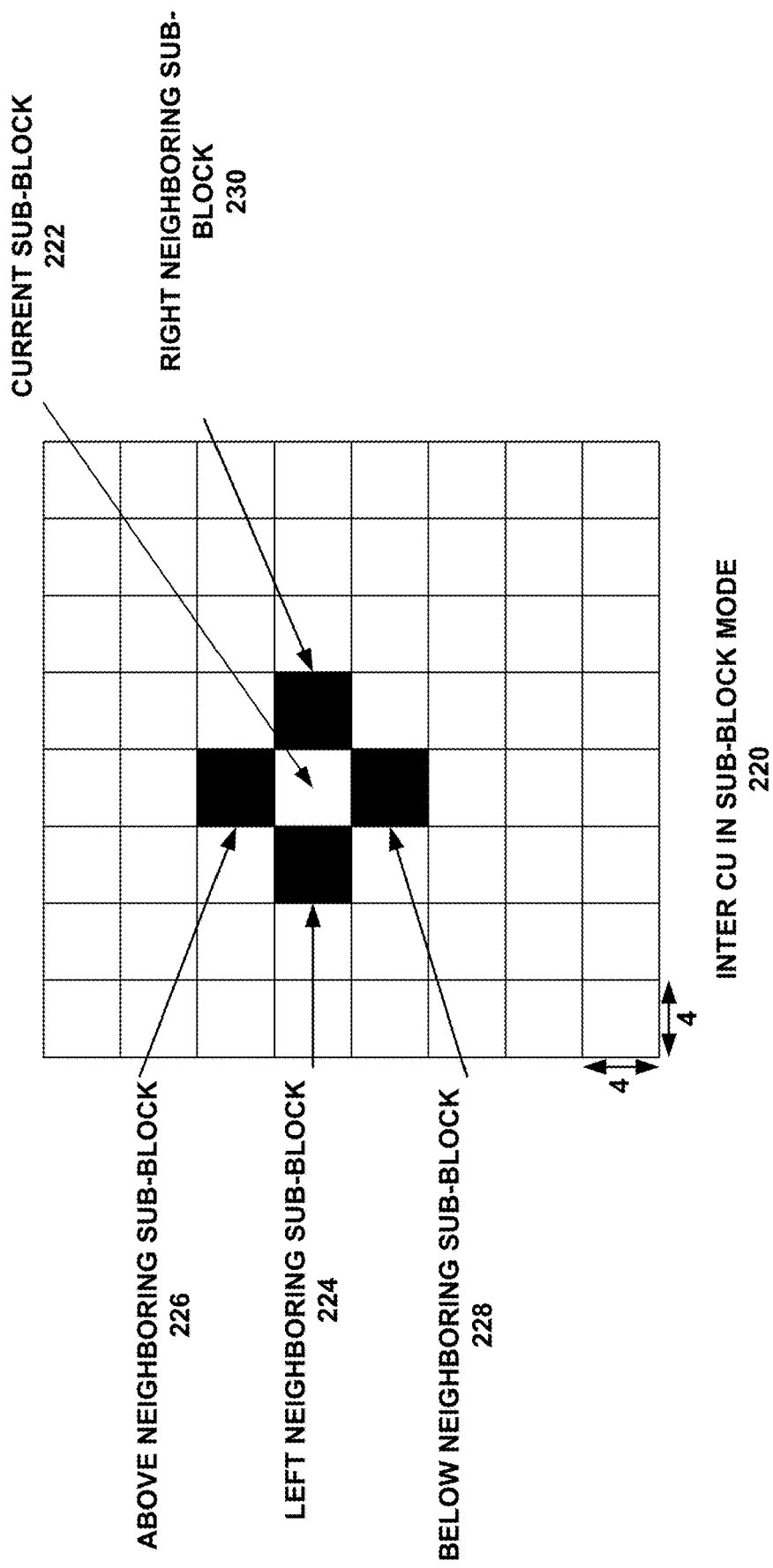

FIG. 7A shows inter CU 210, which includes 4×4 sub-blocks. For current sub-block 212, MVs of left neighboring sub-block 214 and above neighboring sub-block 216 are used in performing OBMC for current sub-block 212.

FIG. 7B shows inter CU 230, which includes 4×4 sub-blocks. For current sub-block 222, MVs of left neighboring sub-block 224, above neighboring sub-block 216, below neighboring sub-block 228, and right neighboring sub-block 230 are used in performing OBMC for current sub-block 212.

Figure 8A:
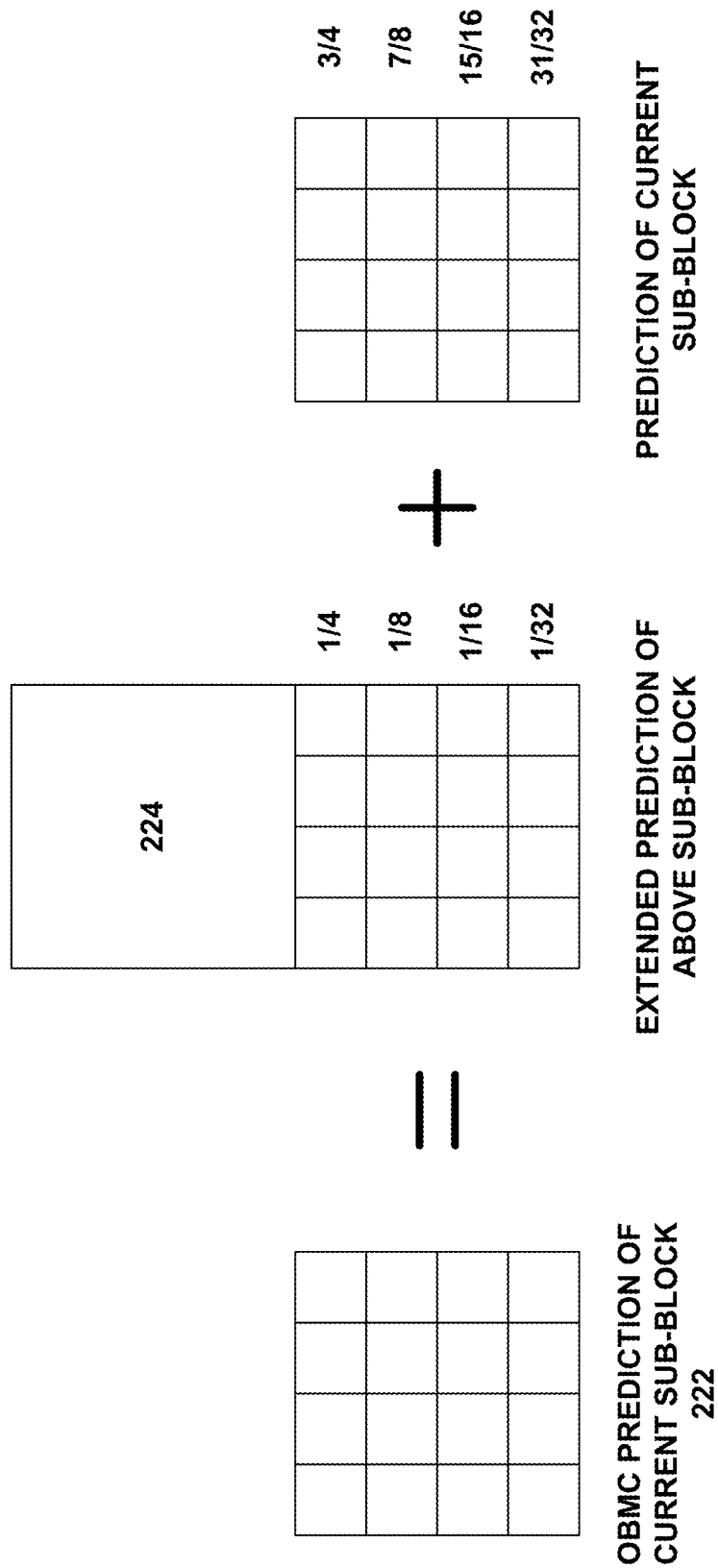
FIGS. 8A-8D show examples of OBMC weightings.
Figure 8B:
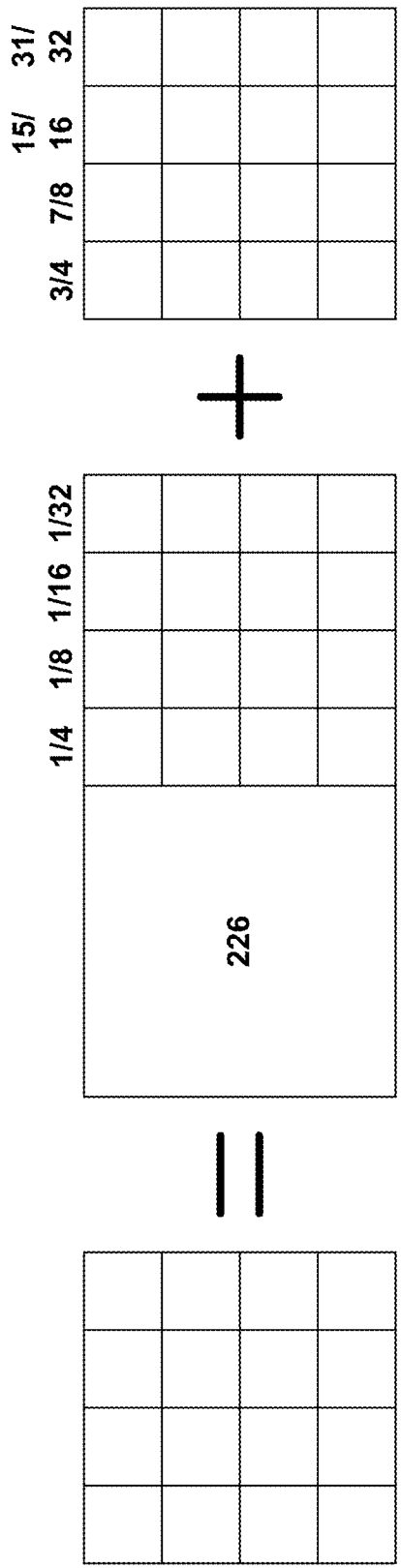
Figure 8C:
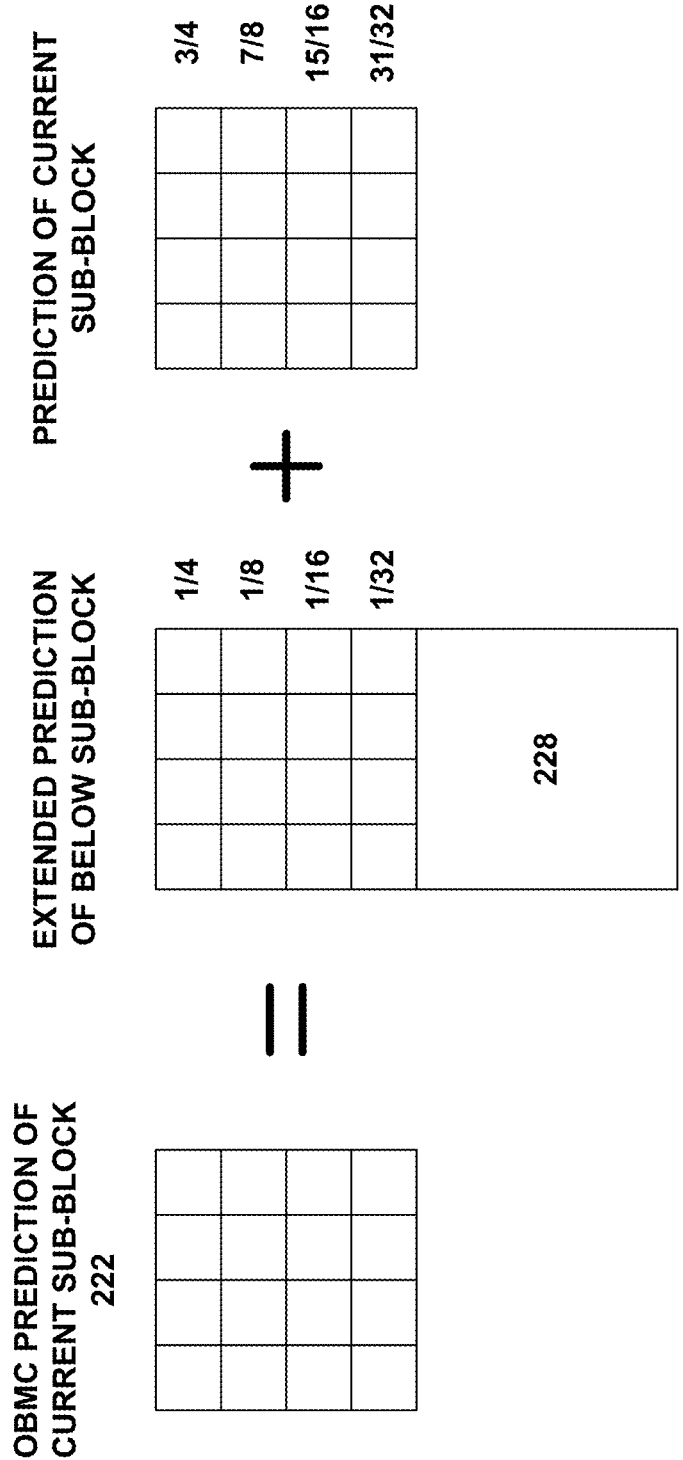
Figure 8D:
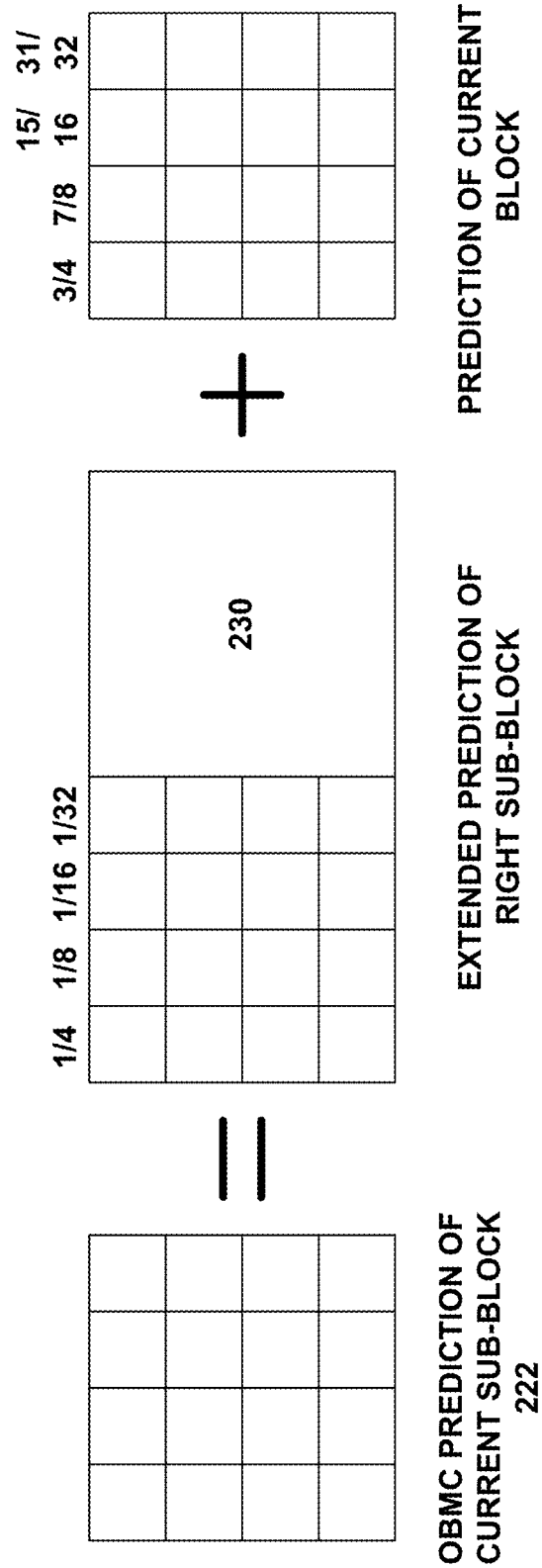

FIGS. 8A-8D illustrate a process for determining a predictive block for current sub-block 212 of FIG. 7B. In the example of FIG. 8A, the OBMC prediction of current sub-block 222 equals a weighted average of the predictive sub-block determined using the MV of above-neighboring block 224 and the predictive sub-block determined for the current sub-block using the MV of the current sub-block. In the example of FIG. 8B, the OBMC prediction of current sub-block 222 equals a weighted average of the predictive sub-block determined using the MV of left-neighboring block 226 and the predictive sub-block determined for the current sub-block using the MV of the current sub-block. In the example of FIG. 8C, the OBMC prediction of current sub-block 222 equals a weighted average of the predictive sub-block determined using the MV of below-neighboring block 228 and the predictive sub-block determined for the current sub-block using the MV of the current sub-block. In the example of FIG. 8D, the OBMC prediction of current sub-block 222 equals a weighted average of the predictive sub-block determined using the MV of right-neighboring block 230 and the predictive sub-block determined for the current sub-block using the MV of the current sub-block.

In JEM, for example, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At video encoder 20, when OBMC is applied for a CU, its impact is taken into account during motion estimation stage. The prediction signal by using motion information of the top neighboring block and the left neighboring block is used to compensate the top and left boundaries of the original signal of the current CU, and then the normal motion estimation process is applied.

BIO can be considered as a post-processing of the regular CU-level or sub-block level MC. While existing BIO implementations offer some coding performance improvements, existing implementations also present complexity issues for both software and hardware designs.

Figure 9:
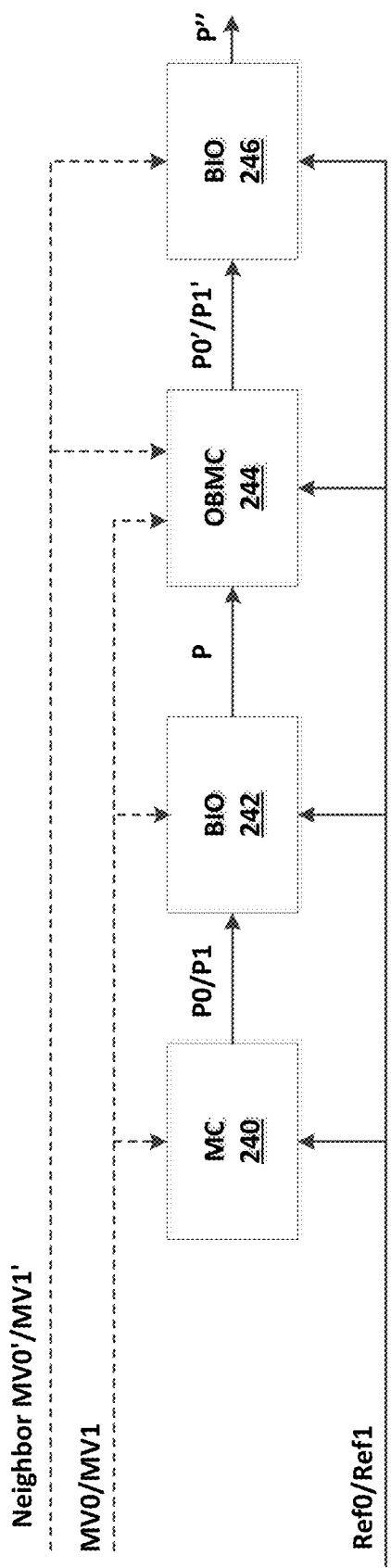
FIG. 9 shows an example of an MC process.

FIG. 9 shows a flow diagram of a BIO design. In the example of FIG. 9, a video coder performs a bi-predictive motion compensation process (MC 240) to determine a predictive block (P0/P1) using two motion vectors (MV0 and MV1) and two reference pictures (Ref0 and Ref1). P0 represents the predictive block generated by MV0, which points to Ref0 in L0. P1 represents the predictive block generated by MV1, which points to Ref1 in L1. The final predictive block of the bi-prediction motion compensation process may, for example, be an average or weighted average of P0 and P1. The video coder performs a BIO process (BIO 242) to the predictive block to determine a BIO-refined predictive block (P). The video coder applies an OBMC process (OBMC 244) to determine a motion compensated predictive block (P0'/P1'). The video coder applies a second BIO process (BIO 246) to generate a final predictive block (P'').

In the example of FIG. 9, bi-predictive motion compensation is followed by BIO filtering for both regular MC and OBMC, and hence, BIO processes are invoked multiple times for the same sub-block. This lengthens the overall motion compensation process as well as may use extra bandwidth introduced by BIO on top of OBMC. Existing BIO implementations utilize division operations to calculate the refined motion vectors, and per-pixel based division operations are expensive in hardware design because, typically, multiple copies of divisors are required to achieve sufficient throughput, resulting in high demand for silicon area. With respect to motion estimation, BIO is a process of MV refinement over a small range of motion search. Existing BIO implementations update the MC predictors as an outcome. However, the motion vectors stored in the MV buffer are not updated accordingly after the refinement, causing an asynchronous design between the MC predictors and the associated motion vectors. The calculation of motion vector refinement currently employs 6-tap interpolation filters and gradient filters, which results in increased complexity.

This disclosure describes techniques that may address issues described above with respect to known implementations of BIO. The following techniques may be applied individually, or alternatively, in any combination.

According to one techniques of this disclosure, a block-based BIO can be designed such that a group of pixels are used to generate a single motion vector refinement for all pixels in the group. The block size can be a pre-defined size including but not limited to 2×2 and 4×4.

The block size can be selected adaptively. For example, it may be based on the resolution of the frame being coded, the size of the entire CU, the temporal layer of the current picture, a quantization factor (QP) used for coding the current picture, and/or the coding mode of the current CU.

Equation (4) above is solved for a square window $\Omega$, which includes the block itself and a neighborhood of the block being considered. In one example, the size of $\Omega$ is 8×8 where the central 4×4 region contains the group of pixels under consideration for calculating the BIO offsets and the surrounding 2-pixel region is the neighborhood of the block.

A weighting function, which may take, including but not limited to, the form of Equation (10) above, may be used to provide different weights to pixels of different locations within the window. In one example, the pixels lying in the central part of $\Omega$ are assigned higher weights than pixels lying around the boundary of $\Omega$. A weighted average can be used to calculate the averaged value of terms in Eq. (7), in order to solve for $v_x$ and $v_y$ for the entire block. In some examples, a median filter may be applied to exclude the outliers in the block before calculating the weighted average to obtain a more stable solution to equation 4.

Additionally, if information indicating that a pixel belongs to an occluded object between Ref0 and Ref1 is available, then the neighboring pixel belonging to the occluded object may be assigned lighter weights. In one example, the pixels belonging to occluded objects may be assigned a weight of 0, while for other pixels, the weights remain unchanged. This allows pixel-level control on whether a specific pixel location is involved with the BIO derivation.

The range of the neighborhood for BIO can be pre-defined. In some examples, the range can be signaled via an SPS, PPS, slice header, or other such data structure. In some examples, the range can be made adaptive based on coding information including but not limited to the BIO block size, CU size, or the resolution of the frame.

According to another technique of this disclosure, the motion vector of a block can be updated after the motion refinement of BIO. In this process, the motion vector (or motion field) of a block is refined by adding the motion information offset derived in BIO. The update can occur after the regular MC process of the current block and refine the MV of the current CU/block before OBMC for subsequent CU/block, so that the updated MV is involved in the OBMC operation of the subsequent CU/blocks. In some examples, the update can occur after OBMC for the subsequent CUs, so that the updated motion vector is only used for prediction of motion vectors. The updated MV update may, for example, be used for any one of or any combination of AMVP mode, merge mode, and FRUC mode.

In some implementations of BIO, the gradient of the fractional sample position is determined based on the integer samples of the reference pictures and by performing interpolation processes in the horizontal and/or vertical directions. To simplify the process of gradient calculation, the gradient can be calculated based on the prediction samples which have already been interpolated based on the existing MV of the current block/CU. The gradient calculation can be applied to the prediction samples at different stages during the generation of the prediction sample. For example, to generate the prediction samples for a bi-prediction block, a video coder first generates L0 prediction samples and L1 prediction samples and then applies a weighted averaging to the L0 and L1 prediction samples to generate the bi-prediction samples. When OBMC is enabled, the generated bi-prediction samples are further weighted averaged with the prediction samples using the neighboring MVs to generate the final prediction samples. In this example, the gradient calculation can be applied to either L0, L1 prediction samples independently; or the gradient calculation can be only applied to the bi-prediction samples and the final prediction samples with the assumption that L0 and L1 predictors share the same gradient values. That is, instead of calculating the gradient values separately using Ref0/Ref1 and summed up during the derivation of BIO motion vectors/offsets, the gradient calculation on the bi-prediction samples can obtain the summed gradient values in a single step.

In one implementation, a 2-tap gradient filter is applied to the prediction samples to calculate the gradients. Let the position of the current pixel in a block be (x, y) and the MC predictor at this location is denoted by P(x, y). The gradient value can be calculated by:

$$G_x(x, y) = \\ ((P(\min(x+1, W-1), y) - P(\max(x-1, 0), y)) * K) \text{ for} \gg S \ x \in [0, W-1]$$

$$G_y(x, y) = ((P(x, \min(H-1, y+1)) - P(x, \max(0, y-1))) * K) \gg S \ y \in [0, H-1]$$

where K and S are scaling factors which can be pre-defined values, W denotes the block width, and H denotes the block height. Note that the location (x, y) can be at any fractional-pel location after interpolation. In one example, the values can be (24, 12, 8) or (26, 13, 8). These values can be signalled in an SPS, PPS, slice header, or other such data structure.

In one example, a longer-tap gradient filter can be applied to the prediction samples to calculate the gradients. For example, the filter with coefficients {8, −39, −3, 46, −17, 5} can be applied. In some examples, the filter with filter coefficients {1, −5, 0, 5, −1}, or other symmetric filter is used. In some examples, the filter with coefficients {10, −44, 0, 44, −10, 0} is used.

According to another technique of this disclosure, the BIO process on OBMC can be entirely or conditionally removed. BIO can utilize reference samples to generate the offset, or it can utilize the MC/OBMC predictors to generate the offset. The generated BIO offset is added to either the MC predictors or the OBMC predictors as motion vector refinement.

Figure 10:
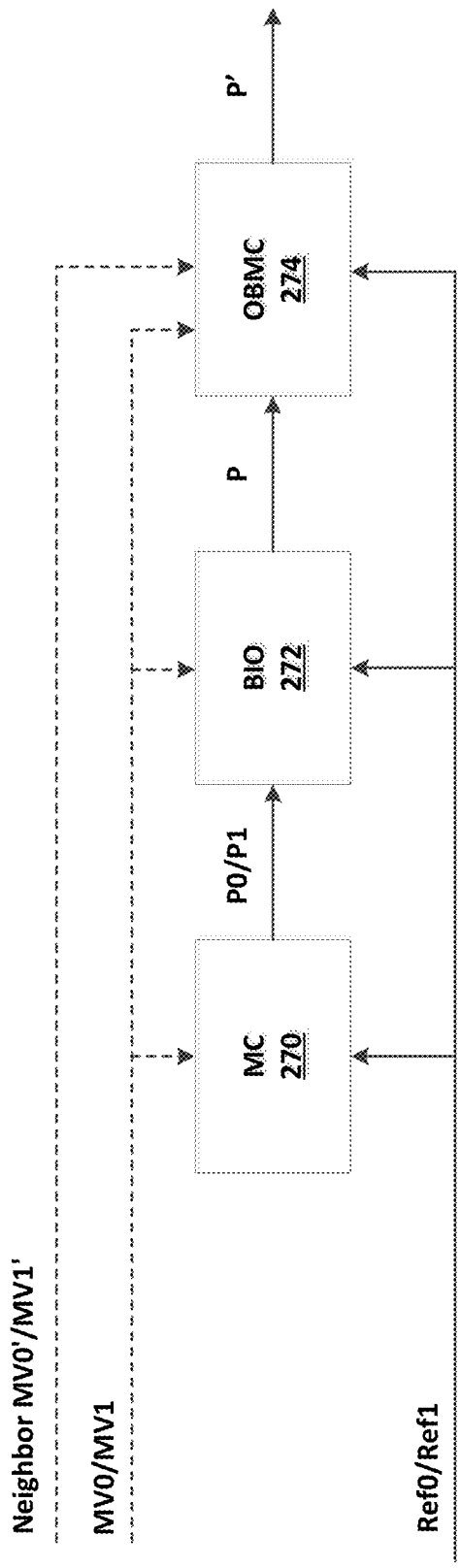
FIG. 10 shows an example of applying BIO.

FIG. 10 shows a flow diagram of a simplified BIO in accordance with techniques of this disclosure. In the example of FIG. 10, a video coder performs a bi-predictive motion compensation process (MC 270) to determine a predictive block (P0/P1) using two motion vectors (MV0 and MV1) and two reference pictures (Ref0 and Ref1). The video coder performs a BIO process (BIO 272) on the predictive block to determine a BIO-refined predictive block (P). The video coder applies an OBMC process (OBMC 274) to the BIO-refined predictive block to determine a final predictive block (P').

FIG. 10 shows an example of BIO derived from Ref0/Ref1 and applied to MC predictors P0/P1. In the example of FIG. 10, the BIO process on OBMC, e.g., BIO 246 in FIG. 9, is removed. BIO offsets are derived from MV0/MV1, Ref0/Ref1, and MC predictor P0/P1, and the offsets are added to P0/P1 during Bi-average. Predictor P' is the final predictor of the overall MC process. The dotted lines indicate the motion vector information in the figure and the solid lines indicate the actual pixel data either for prediction or reference samples. In FIG. 10, the BIO operation following MC utilizes the MC predictors P0/P1 along with the gradient values derived from Ref0/Ref1 using motion vectors MV0/MV1 to calculate the motion vector refinement and offsets. The output of the BIO (P) is generated by a bi-average of P0/P1 added by BIO offsets on a per-pixel basis (even with block-level BIO where the motion vector refinement remains the same within the block, BIO offset can still be on a per-pixel basis since gradient values for each pixel can be different).

Figure 11:
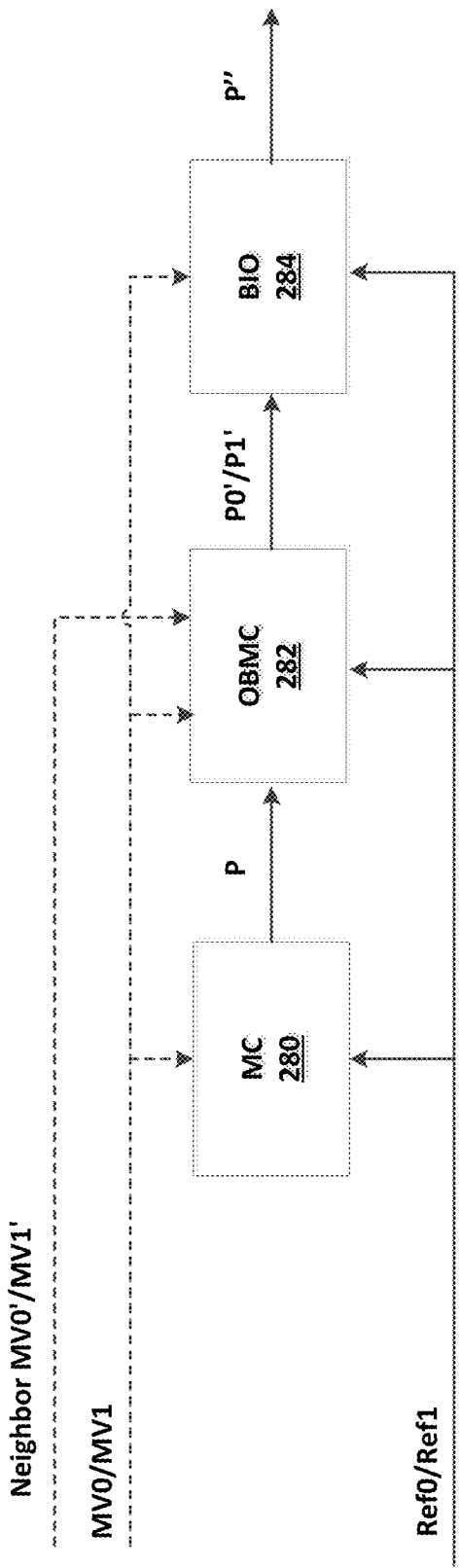
FIG. 11 shows an example of applying BIO.

FIG. 11 shows a flow diagram of a simplified implementation of BIO in accordance with techniques of this disclosure. In the example of FIG. 11, a video coder performs a bi-predictive motion compensation process (MC 280) to determine a predictive block (P) using two motion vectors (MV0 and MV1) and two reference pictures (Ref0 and Ref1). The video coder applies an OBMC process (OBMC 282) to the predictive block to determine a motion compensated predictive block (P0'/P1'). The video coder applies a BIO process (BIO 284) to the motion compensated predictive block to determine a final predictive block (P'').

FIG. 11 shows an example of BIO derived from Ref0/Ref1 and applied to OBMC predictors P0'/P1'. BIO offsets are derived from MV0/MV1, Ref0/Ref1, and the OBMC predictors P0'/P1', and the offsets are added to P0'/P1' during Bi-average. Predictor P'' is the final predictor of the overall MC process.

Figure 12:
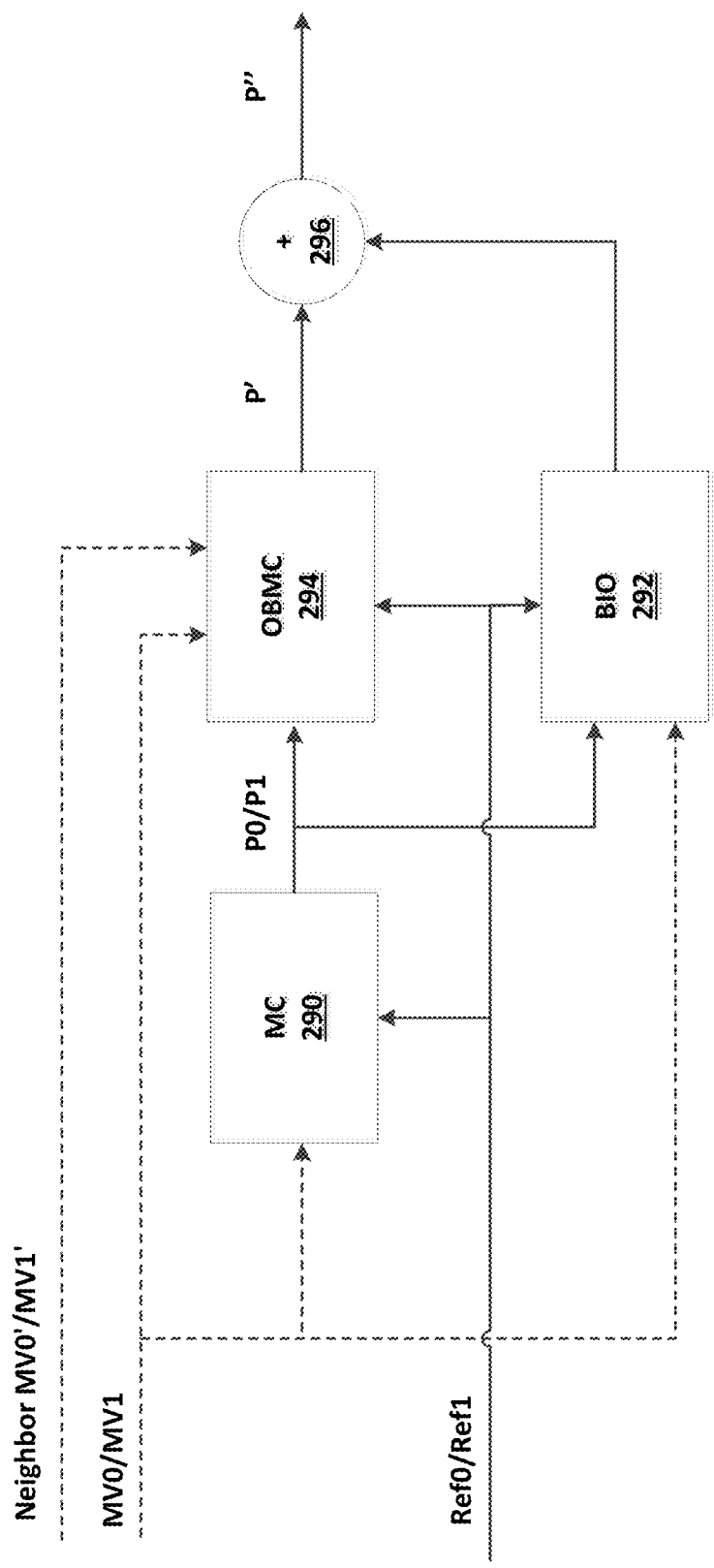
FIG. 12 shows an example of applying BIO.

FIG. 12 shows a flow diagram of a simplified BIO in accordance with techniques of this disclosure. In the example of FIG. 12, a video coder performs a bi-predictive motion compensation process (MC 290) to determine a predictive block (P0/P1) using two motion vectors (MV0 and MV1) and two reference pictures (Ref0 and Ref1). The video coder performs a BIO process (BIO 292) on the predictive block to determine a BIO-refined predictive block and, in parallel, performs an OBMC process (OBMC 294) on the predictive block to determine a motion compensated predictive block (P'). The video coder sums (296) the BIO-refined predictive block and the motion compensated predictive block to determine a final predictive block (P").

FIG. 12 shows an example of BIO derived from/applied to MC predictors P0/P1. Gradient values are calculated using MV0/MV1 and Ref0/Ref1, and then used to generate the BIO offsets along with MC predictor P0/P1. The offsets are added to the OBMC predictor P' to generate the final predictor P" of the overall MC process.

Figure 13:
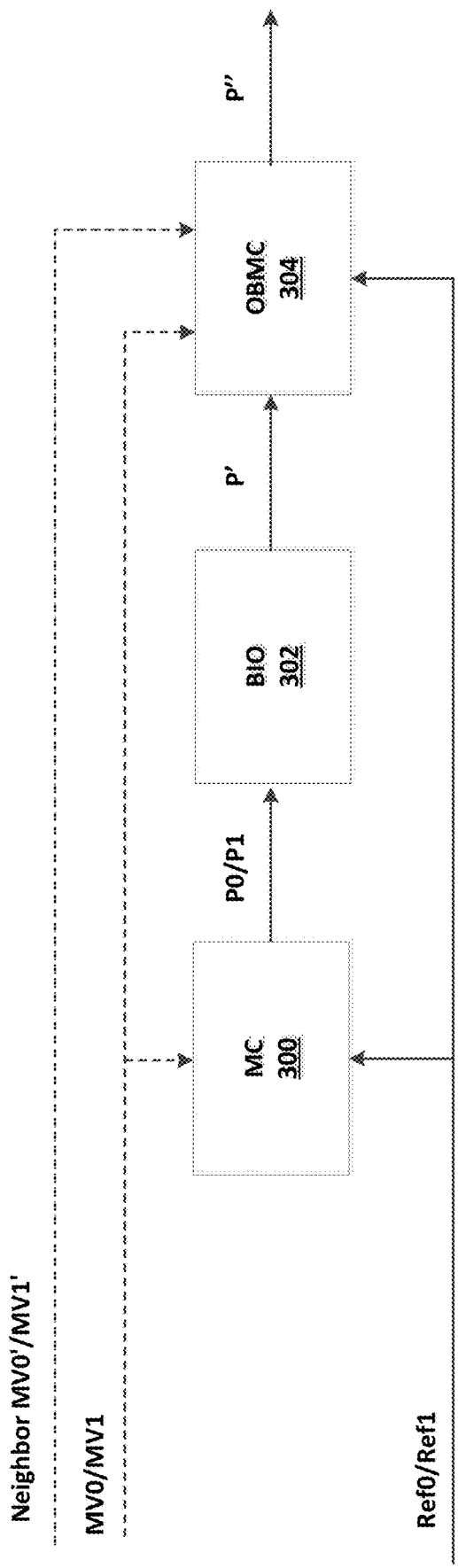
FIG. 13 shows an example of applying BIO.

FIG. 13 shows a flow diagram of a simplified BIO in accordance with techniques of this disclosure. In the example of FIG. 13, a video coder performs a bi-predictive motion compensation process (MC 300) to determine a predictive block (P0/P1) using two motion vectors (MV0 and MV1) and two reference pictures (Ref0 and Ref1). The video coder performs a BIO process (BIO 302) on the predictive block to determine a BIO-refined predictive block (P'). The video coder applies an OBMC process (OBMC 304) on the BIO-refined predictive block to determine a final predictive block (P").

FIG. 13 shows an example of BIO derived from/applied to MC predictors P0/P1. BIO offsets are calculated using the MC predictors P0/P1, and the offsets are added to P0/P1 during Bi-average, followed by an OBMC process to generate the final predictor P" of the overall MC process.

Figure 14:
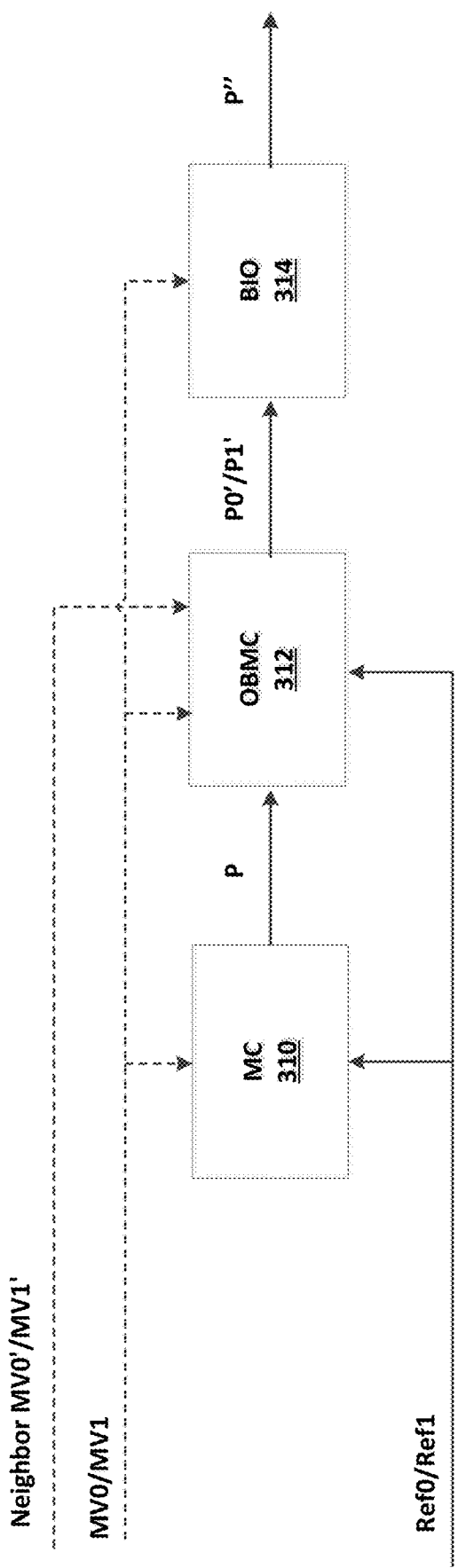
FIG. 14 shows an example of applying BIO.

FIG. 14 shows a flow diagram of a simplified implementation of BIO in accordance with techniques of this disclosure. In the example of FIG. 14, a video coder performs a bi-predictive motion compensation process (MC 310) to determine a predictive block (P) using two motion vectors (MV0 and MV1) and two reference pictures (Ref0 and Ref1). The video coder applies an OBMC process (OBMC 312) to the predictive block to determine a motion compensated predictive block (P0'/P1'). The video coder applies a BIO process (BIO 314) to the motion compensated predictive block to determine a final predictive block (P").

FIG. 14 shows an example of simplified BIO using only an OBMC predictor. Gradient values are derived using the OBMC predictors P0'/P1' and motion vectors MV0/MV1, and the BIO offsets are calculated using the OBMC predictors P0'/P1'. The offsets are added to P0'/P1' during Bi-average to generate the final predictor P" of the overall MC process.

In one example, the BIO in OBMC can be disabled conditionally. Let $MV_{CUR}x$ and $MV_{NBR}x$ be the motion vectors of current block and the neighboring block for Listx (where x is 0 or 1) during the OBMC process. In one example, if the absolute value of the motion vector difference between $MV_{CUR}0$ and $MV_{NBR}0$, and the absolute value of the motion vector difference between $MV_{CUR}1$ and $MV_{NBR}1$ are both less than a threshold, the BIO in OBMC can be disabled. The threshold can be signalled in an SPS, PPS, slice header, or other such data structure, or a pre-defined value (e.g., half-pixel, one-pixel, or any value that is equal to the search range of the BIO motion vector refinement) can be used. In another example, if the absolute value of the motion vector difference between $MV_{NBR}0$ and $MV_{NBR}1$ is less than a threshold, BIO in OBMC can be disabled.

In one example, the number of BIO operations in the overall MC process is capped with a pre-determined value. For example, the BIO process is at most performed N times (e.g. N can be 1 or any positive integer) for each block (block can be CTU, CU, PU or an M×N block). In one example, the BIO is only allowed to be performed once for each block. When the prediction samples are generated using current motion information with BIO applied, no further BIO is allowed for the generation of the other prediction samples for current block such as OBMC or any other methods to refine the prediction samples. However, when the prediction samples are generated using current motion information without BIO applied, at most one BIO is allowed for the generations of the other prediction samples for the current block such as OBMC or any other method to refine the prediction samples.

According to techniques of this disclosure, a block-based design of BIO is proposed. Instead of pixel level motion refinement (e.g., as in JEM5), the motion refinement is done based on a 4×4 block. In the block-based BIO the weighted summation of gradients for the samples in a 4×4 block is used to derive BIO motion vector offsets for the block.

The other processes, such as calculation of gradients, BIO motion vectors and offsets, may, for example, follow the same procedure as done in various iterations of JEM. After the 4×4 MV for each MV is obtained with block-based BIO, the MV buffer is updated and used for subsequent CU coding. The overall block diagram is shown in FIG. 15, where the OMBC is applied without BIO operation.

Figure 15:
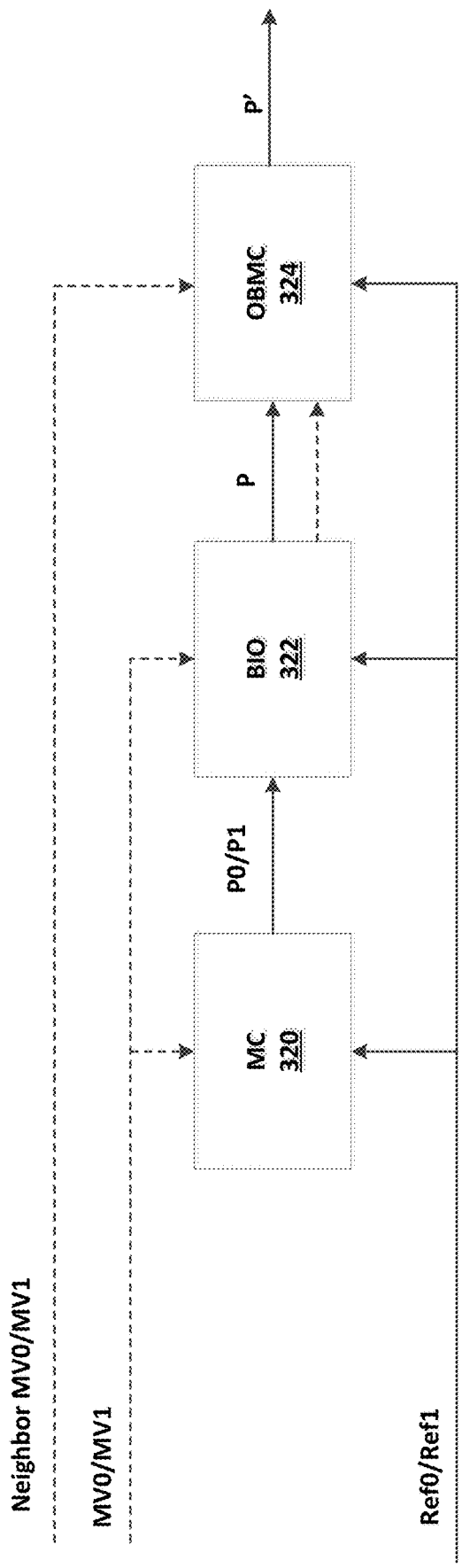
FIG. 15 shows an example of applying BIO.

FIG. 15 shows an example of applying BIO according to techniques of this disclosure. In the example of FIG. 15, a video coder performs a bi-predictive motion compensation process (MC 320) to determine a predictive block (P0/P1) using two motion vectors (MV0 and MV1) and two reference pictures (Ref0 and Ref1). The video coder performs a BIO process (BIO 322) on the predictive block to determine a BIO-refined predictive block (P). The video coder applies an OBMC process (OBMC 304) on the BIO-refined predictive block to determine a final predictive block (P').

This portion of the disclosure will now describe various simplified architectures that may be implemented in conjunction with the techniques described above. Among those architectures, this disclosure describes, for purposes of example only, the scenario when a simplified gradient filter is used to derive the gradient values based on interpolated samples. That is, the reference samples are not directly required during the derivation of BIO offset. Instead, regular prediction samples are generated followed by the gradient calculation.

In some of the techniques described above, due to the required pixel extension for calculating the intermediate values for BIO offsets, for a block of size W×H and N-tap interpolation filter (e.g., 8-tap used in HEVC and existing JEM), the number of required reference samples is (W+N−1+4)×(H+N−1+4), assuming the extension is by 2 pixels. This increases the bandwidth requirement compared to the existing MC interpolation, in which the number of required reference samples is (W+N−1)×(H+N−1).

In some of the techniques described above, the synchronization of motion information poses a dependency issue as the motion vectors are changed during motion compensation process. This may create difficulty for some implementations where latency is critical and by changing the motion vector during the MC process, techniques for latency reduction such as reference data pre-fetch may not perform effectively. Moreover, the additional interpolation filter of existing BIO may introduce additional computational and storage complexity. To address some of these issues, this disclosure introduces several techniques. The following techniques may be implemented individually, or in any combination.

In some of the techniques described above, due to the required samples extension for calculating the intermediate values for BIO offsets, the number of required reference samples is increased when compared to the existing MC interpolation process. In this disclosure, several examples are described such that the number of reference samples being utilized to derive the BIO offsets are limited to the same set of samples used in the regular interpolation process. For example, when an N-tap MC interpolation filter is used, the required number of reference samples is limited to (W+N−1)×(H+N−1). This can be achieved in multiple ways.

Figure 16:
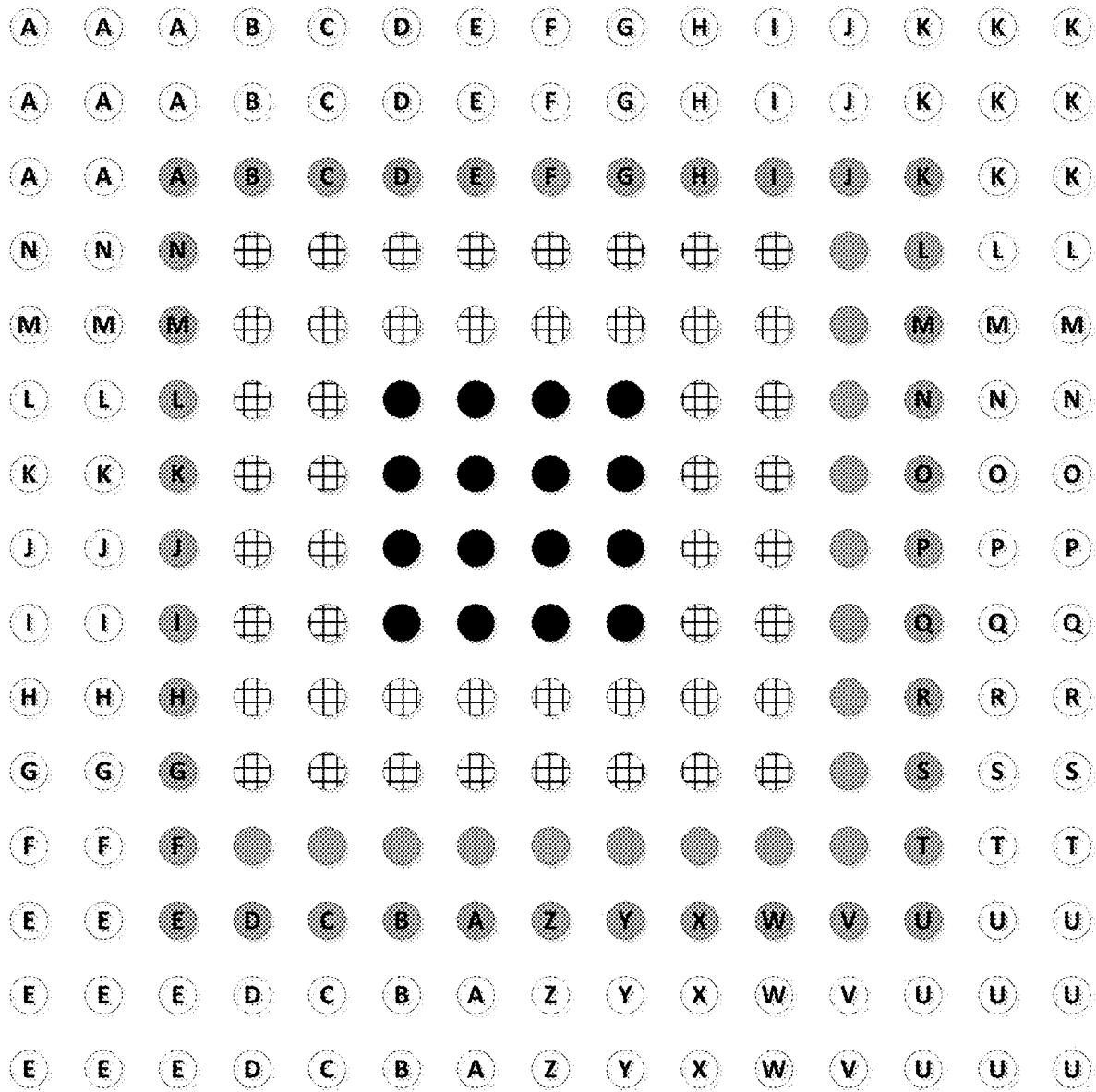
FIG. 16 shows an illustration of the pixels used for applying a BIO process.

FIG. 16 shows an illustration of pixel space 328, which includes the groups of pixels used for applying a typical BIO process. In the example of FIG. 16, pixel space 328 includes a first group of pixels which represent pixels for which BIO is being performed. Pixel space 328 also includes a second group of pixels which are used for performing BIO on the first group of pixels. For BIO, interpolation filtering is performed for the second group of pixels. Performing interpolation filtering for the second group of pixels includes additional pixels. These additional pixels are shown in pixel space 328 as a third group of pixels and a fourth group of pixels. Therefore, in order to perform BIO on the first group of pixels, the second, third, and fourth groups of pixels need to be stored and fetched from memory. As will be explained in greater detail below, the techniques of this disclosure may reduce the size of the pixel space needed for performing BIO, which may enable BIO to be performed without storing or fetching the fourth group of pixels.

According to one technique of this disclosure, a shorter-tapped interpolation filter may be used to utilize the limited reference samples. This includes, but is not limited to, the bi-linear filter (2-tap) or the HEVC-chroma filter (4-tap). If the filter length is N for luma interpolation and the size of extension is S, any interpolation filter with filter length less than or equal to N−2S can satisfy the same memory requirement. The shorter tapped interpolation filter may be only applied to the extended regions for BIO offset calculation. The normal MC interpolation filter is still applied to generate the MC output of the current block.

According to one technique of this disclosure, reference sample repetition can be exploited to extend the samples on the boundary of the reference sample block to the places where additional samples are needed for calculation of the intermediate values for BIO offsets, as illustrated in FIG. 16. The amount of sample repetition can vary depending on the size of the extended region for BIO calculation. For example, when N-tap MC interpolation filter is used, a reference sample block with size (W+N−1)×(H+N−1) is firstly fetched. Then sample repetition is applied to all the boundaries of the reference block to generate an extended reference block with size of (W+N−1+2S)×(H+N−1+2S), where S is the size of extension for BIO offset calculation. Then the BIO and MC process, as described above, is applied to the extended reference block.

In one example, horizontal repetition is applied first then followed by vertical repetition. In some examples, vertical repetition is applied first then followed by horizontal repetition. FIG. 16 shows an example of this repetition. In another example, pixels on the top, bottom, left, and right to the current blocks are extended by repetition while the pixels at top-left, top-right, bottom-left and bottom-right corners are obtained by averaging pixels which have been extended with weights. The weights may be predefined or signaled. The weights may depend on relative positions to the current block.

Due to reference sample repetition occurring at a CU boundary, the memory-constrained BIO techniques described above for limiting the number of reference samples utilized for deriving BIO offsets may generate different results for blocks of different sizes that have the same motion information. For example, when performing the memory-constrained BIO for the same set of samples but with different processing sizes (e.g., for one 2N×M block or two N×M blocks individually) with the same motion information, the generated prediction samples may be different. That is, the boundary of the processing unit affects the BIO results. To address this, in one example, during the derivation of the BIO offset, calculation of the gradient and interpolation for the BIO offset always occurs on a N×M-block basis. That is, for BIO processing, the processing unit is limited to N×M. When M and N are equal to the minimum block size where MC occurs, any CU can be partitioned into integer multiples of such sub-blocks. When M×N are greater than the minimum block size, in one example, CUs are still partitioned into integer multiples of M×N while for the remainder part of the CU, the minimum block size should be used for BIO processing. In some examples, the remainder part of the CU can use the boundaries which are the union of both the M×N block grid and the true CU boundary. The values of N and M (which can both be equal to 4 (e.g., in existing JEM implementations)) can be pre-defined or signalled in a video parameter set (VPS), SPS, PPS, slice header, CTU, or CU. This provides an alternative implementation option for the motion compensation process and creates consistency between various block sizes for motion compensation.

In one example, synchronization of motion information may be used by the motion-compensation process only. In one example, the synchronization occurs after the regular MC process and before the OBMC process, but the synchronization does not affect the motion prediction of the subsequent blocks. That is, the synchronization does not update the content of the motion information buffer. This provides more flexibility for parallel processing of blocks. The motion vectors used in the motion compensation process for a block and the motion vectors stored for this block can be different.

Figure 17:
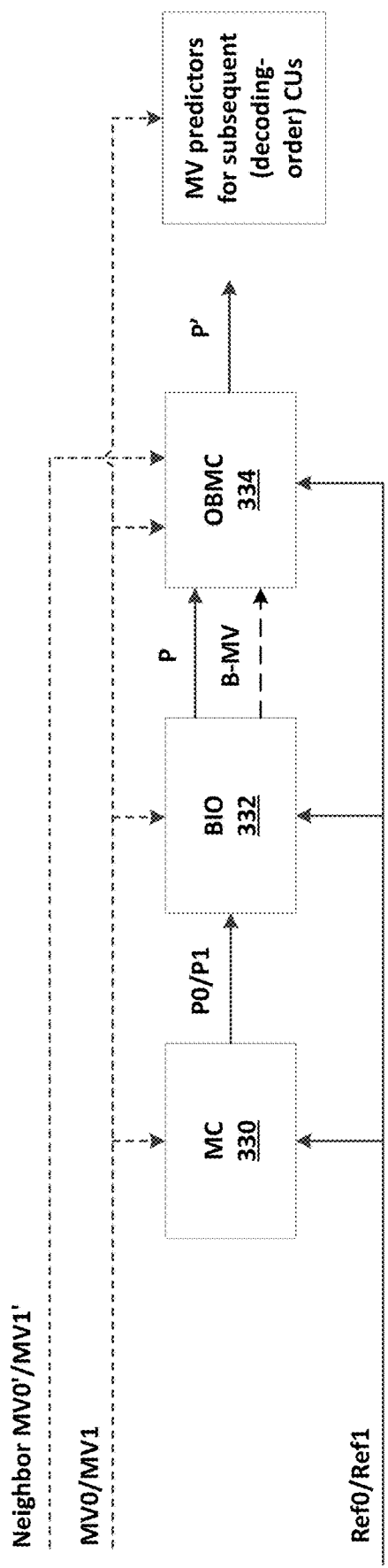
FIG. 17 shows an illustration of BIO derived from Ref0/Ref1 and applied to MC predictors P0/P1.

In one example, the BIO process which utilizes the reference samples to generate offsets and the associated motion vector values are used only during the OBMC process but not propagate to the MV prediction or merge candidates for the following CUs, as illustrated in FIG. 17.

FIG. 17 shows an illustration of BIO derived from Ref0/Ref1 and applied to MC predictors P0/P1. In the example of FIG. 17, a video coder performs a bi-predictive motion compensation process (MC 330) to determine a predictive block (P0/P1) using two motion vectors (MV0 and MV1) and two reference pictures (Ref0 and Ref1). The video coder performs a BIO process (BIO 332) on the predictive block to determine a BIO-refined predictive block (P). The video coder applies an OBMC process (OBMC 334) on the BIO-refined predictive block to determine a final predictive block (P').

In the example of FIG. 17, the BIO-derived motion vectors (B-MV) are used by the OBMC process only. In some examples, when a BIO process is invoked during the OBMC process, as shown in this example, the MVs do not need to be updated.

Figure 18:
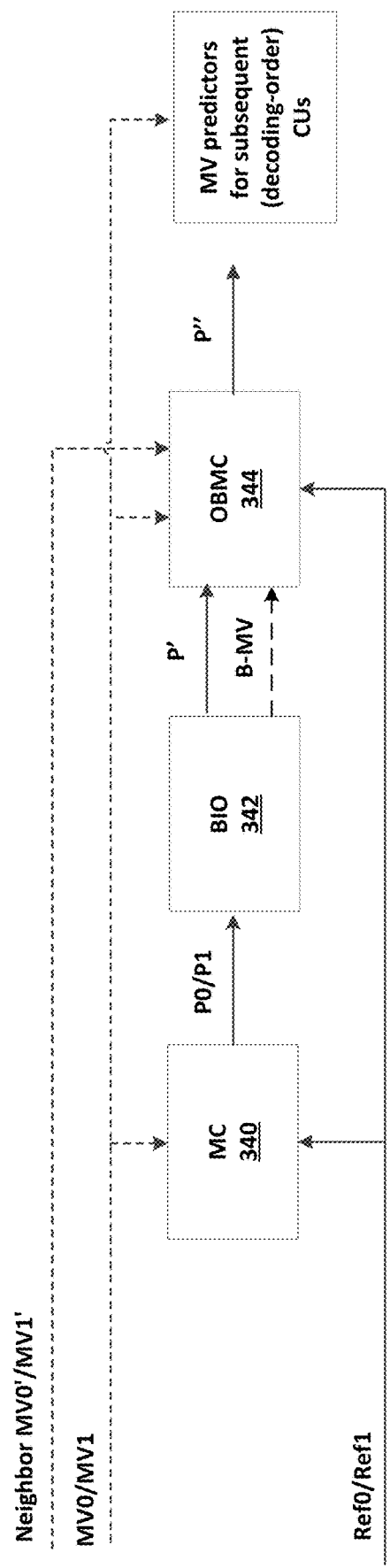
FIG. 18 shows an illustration of BIO derived from/applied to MC predictors P0/P1.

FIG. 18 shows an illustration of BIO derived from/applied to MC predictors P0/P1. In the example of FIG. 18, a video coder performs a bi-predictive motion compensation process (MC 340) to determine a predictive block (P0/P1) using two motion vectors (MV0 and MV1) and two reference pictures (Ref0 and Ref1). The video coder performs a BIO process (BIO 342) on the predictive block to determine a BIO-refined predictive block (P'). The video coder applies an OBMC process (OBMC 344) on the BIO-refined predictive block to determine a final predictive block (P''). In the example of FIG. 18, the prediction samples generated from the regular motion compensation process are input into BIO 342. The refined motion vector (B-MV) is then input into OBMC 344. MV prediction for subsequent CUs, however, uses the same MV as the neighboring MVs without using any BIO MV refinement.

Figure 19:
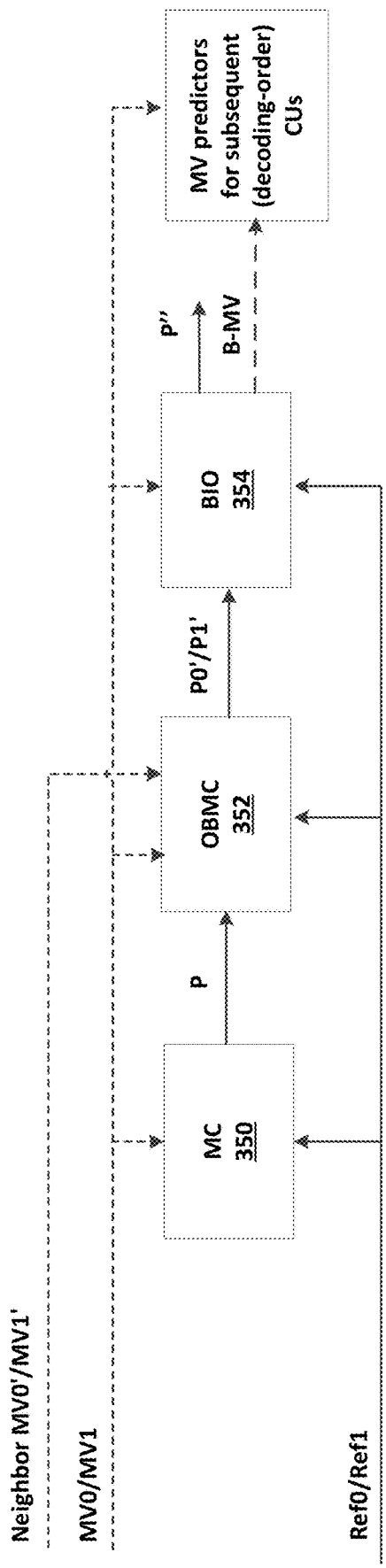
FIG. 19 shows an illustration of simplified BIO using an OBMC predictor.

FIG. 19 shows an illustration of simplified BIO using only an OBMC predictor. In the example of FIG. 19, a video coder performs a bi-predictive motion compensation process (MC 350) to determine a predictive block (P) using two motion vectors (MV0 and MV1) and two reference pictures (Ref0 and Ref1). The video coder applies an OBMC process (OBMC 352) to the predictive block to determine a motion compensated predictive block (P0'/P1'). The video coder applies a BIO process (BIO 354) to the motion compensated predictive block to determine a final predictive block (P''). When the BIO process is the last stage of an overall MC process, as in FIG. 19, the motion refinement can occur conditionally, meaning the MV predictors for subsequent CUs can be either the BIO-refined MV or the MVs used for Bi prediction. The condition can be based on signalling through high-level syntax such as in a VPS, SPS, PPS, slice header, or other such data structure.

Figure 20:
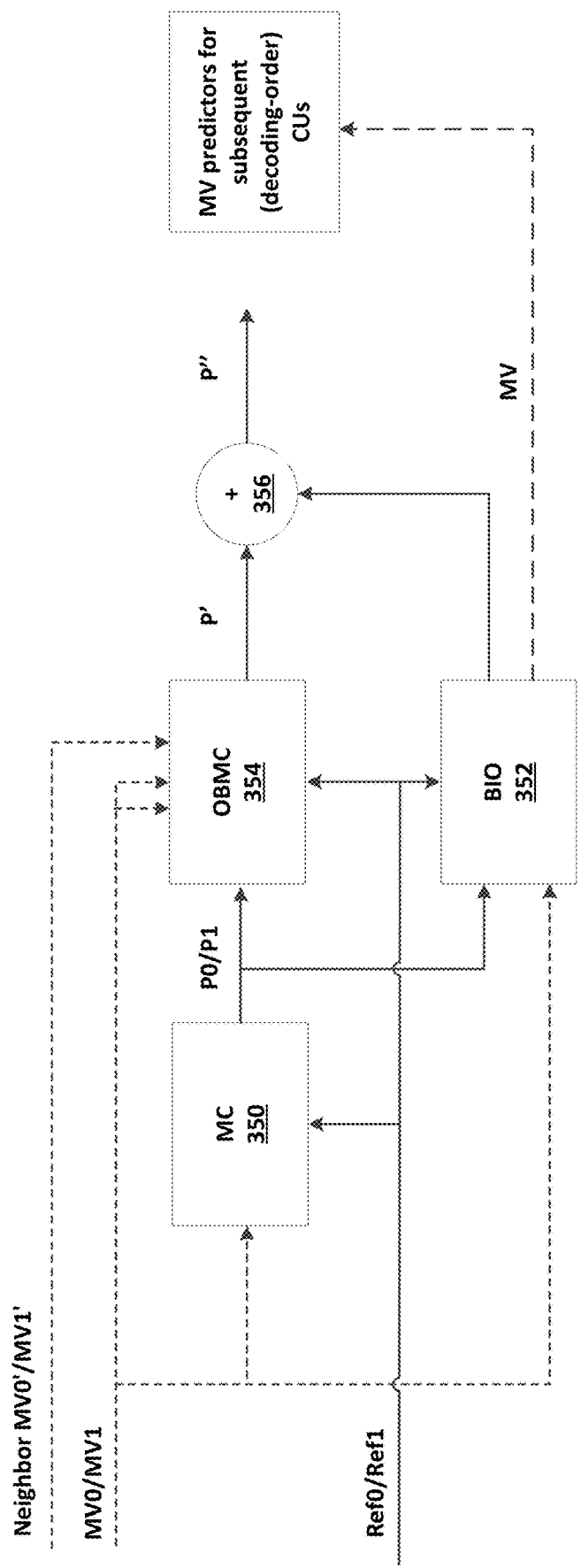
FIG. 20 shows an illustration of BIO derived from and applied to MC predictors P0/P1 with parallel processing of an OBMC process and a BIO process.

FIG. 20 shows an illustration of BIO derived from and applied to MC predictors P0/P1 with parallel processing of OBMC and BIO. In the example of FIG. 20, a video coder performs a bi-predictive motion compensation process (MC 350) to determine a predictive block (P0/P1) using two motion vectors (MV0 and MV1) and two reference pictures (Ref0 and Ref1). The video coder performs a BIO process (BIO 352) on the predictive block to determine a BIO-refined predictive block and, in parallel, performs an OBMC process (OBMC 354) on the predictive block to determine a motion compensated predictive block (P'). The video coder sums (356) the BIO-refined predictive block and the motion compensated predictive block to determine a final predictive block (P'''). For BIO which operates in parallel to OBMC, as in the example of FIG. 20, the motion refinement can occur conditionally. In some examples, the condition can be based on the block size. For example, when the block size is smaller than or equal to M×N, then the refined motion vectors from BIO should be used. Otherwise, the original MV should be used. The values of M and N can be predefined or signaled from the encoder to the decoder.

According to some existing techniques, BIO and OBMC may be applied sequentially, that is OBMC is applied after BIO offsets are added to the current MC block. To shorten the process train, in some example techniques, after the MC process is done, the OBMC process and BIO process may be applied in parallel based on the output of MC of the current block. One example of the proposed method is shown in FIG. 20, where the final prediction is an weighted average of the output of OBMC and BIO. The weighting information may be predefined or signaled. The weighting may also depend on previously coded information, such as block size, block mode (such as skip, merge, IC), and motion vectors.

When BIO offsets are derived from reference samples, the 6-tap interpolation filter used by the existing BIO (as of JEM 6.0) can be replaced by a regular interpolation filter, meaning that the interpolation filter used for BIO can be the same interpolation filter used for other inter prediction modes. In one example, the existing HEVC interpolation filter can be used to generate the fractional-pel prediction samples for gradient calculation.

The use of an additional gradient filter can be removed by incorporating a gradient filter (as described above) by using the interpolation filter in the regular motion compensation process. In one example, a 4-tap gradient filter can be used with symmetric coefficients $\{2, -9, 0, 9, -2\}$. As described above, these values can be signalled in an SPS, PPS, slice header, or other such data structure. In one example, video signals with different resolutions can use different set of filter coefficients. In some examples, the filter coefficients can be designed based on the fractional-pel position of the motion vector. The filter coefficients can also be predefined based on the above parameters.

Figure 21:
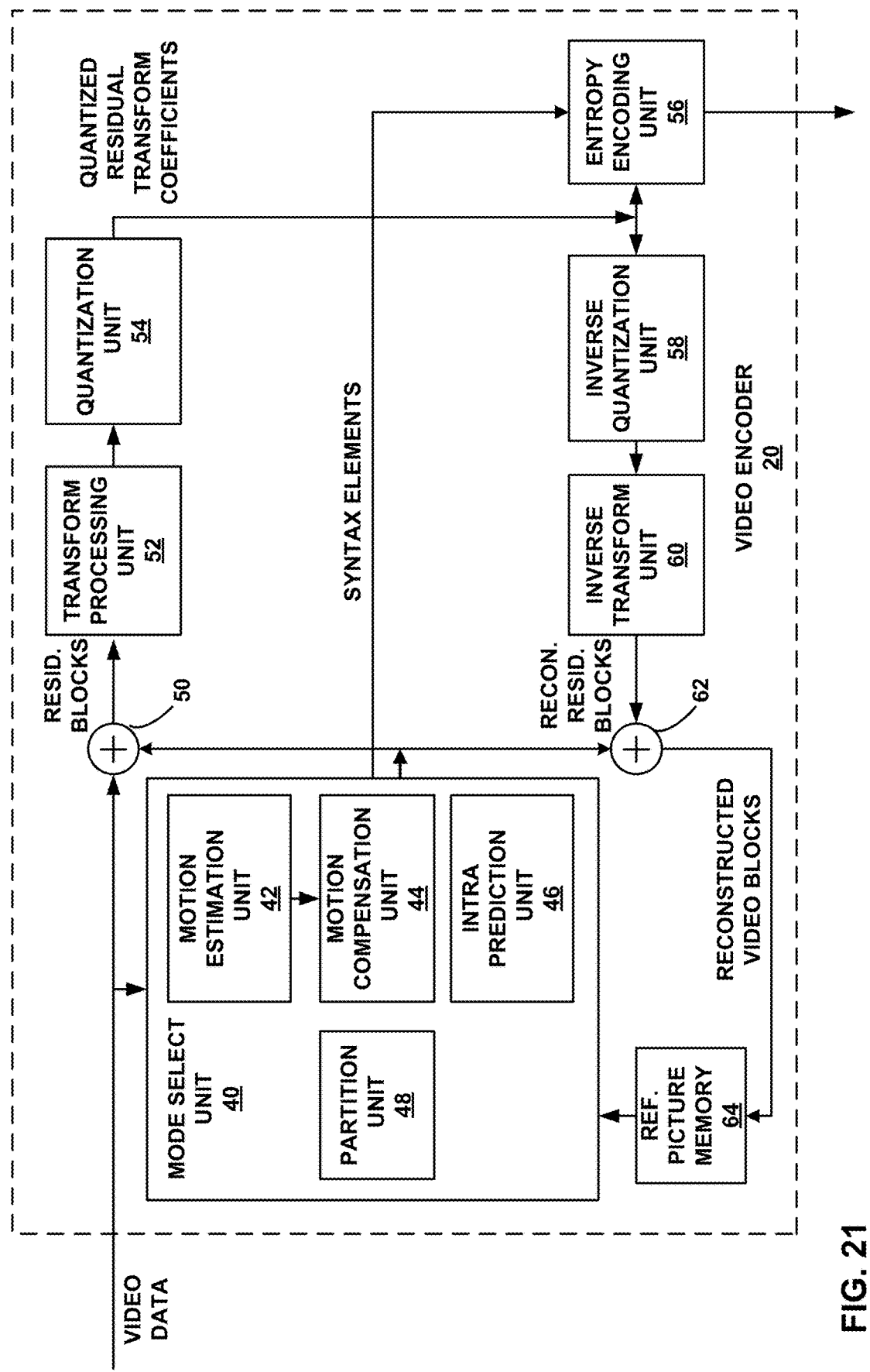
FIG. 21 is a block diagram illustrating an example of a video encoder.

FIG. 21 is a block diagram illustrating an example of video encoder 20 that may implement techniques for bi-directional optical flow. Video encoder 20 may perform intra- and inter-coding of video blocks within video slices. Intra-coding uses spatial prediction to reduce or remove spatial redundancy in a video within a given video frame or picture. Inter-coding uses temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 21, video encoder 20 receives a current video block within a video frame to be encoded. In the example of FIG. 21, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 21) may also be included to filter block boundaries to remove blockiness artifacts from reconstructed video. If used, the deblocking filter would typically filter the output of summer 62. Additional filters (in loop or post loop) may also be used in addition to the deblocking filter. Such filters are not shown for brevity, but if desired, may filter the output of summer 62 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively intra-predict the received video block using pixels of one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the prediction modes, intra or inter, e.g., based on error results, and provide the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be completely or partially integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Furthermore, motion compensation unit 44 may be configured to perform any or all of the techniques of this disclosure (alone or in any combination). Although discussed with respect to motion compensation unit 44, it should be understood that mode select unit 40, motion estimation unit 42, partition unit 48, and/or entropy encoding unit 56 may also be configured to perform certain techniques of this disclosure, alone or in combination with motion compensation unit 44. In one example, motion compensation unit 44 may be configured to perform the BIO techniques discussed herein.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. Entropy encoding unit 56 may encode information indicating the selected intra-prediction mode or inter-prediction mode.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block that is represented by transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Figure 22:
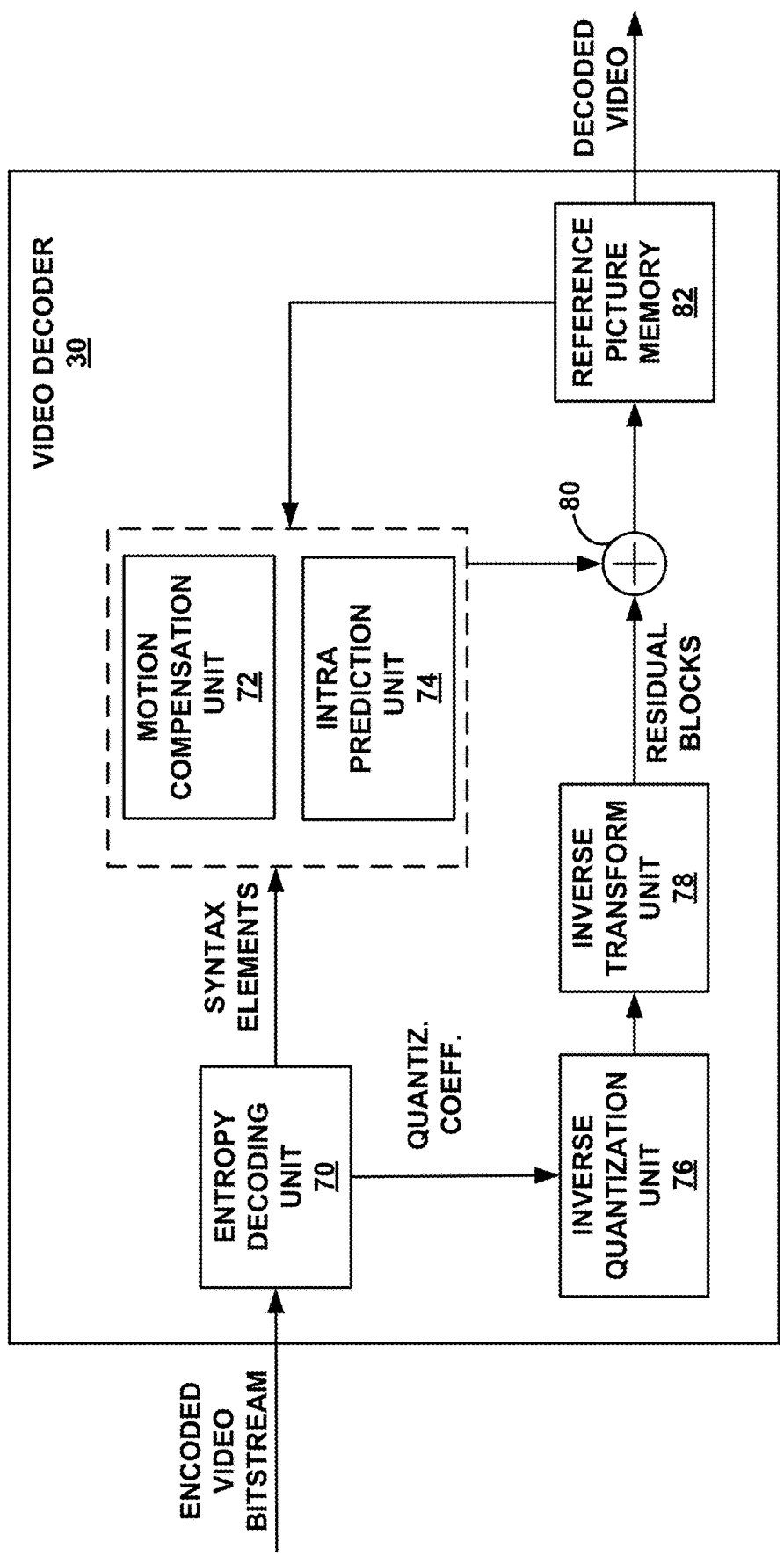
FIG. 22 is a block diagram illustrating an example of a video decoder.

FIG. 22 is a block diagram illustrating an example of video decoder 30 that may implement techniques for bi-directional optical flow. In the example of FIG. 22, video decoder 30 includes an entropy decoding unit 70, motion compensation unit 72, intra-prediction unit 74, inverse quantization unit 76, inverse transform unit 78, reference picture memory 82 and summer 80. Video decoder 30 may, in some examples, perform a decoding pass generally reciprocal to the encoding pass described with respect to video encoder 20 (FIG. 21). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters for sub-pixel precision. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Furthermore, motion compensation unit 72 may be configured to perform any or all of the techniques of this disclosure (alone or in any combination). For example, motion compensation unit 72 may be configured to perform the BIO techniques discussed herein.

Inverse quantization unit 76 inverse quantizes, i.e., de-quantizes, the quantized transform coefficients provided in the bitstream and decoded by entropy decoding unit 70. The inverse quantization process may include use of a quantization parameter QPy calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1. For example, reference picture memory 82 may store decoded pictures.

Figure 23:
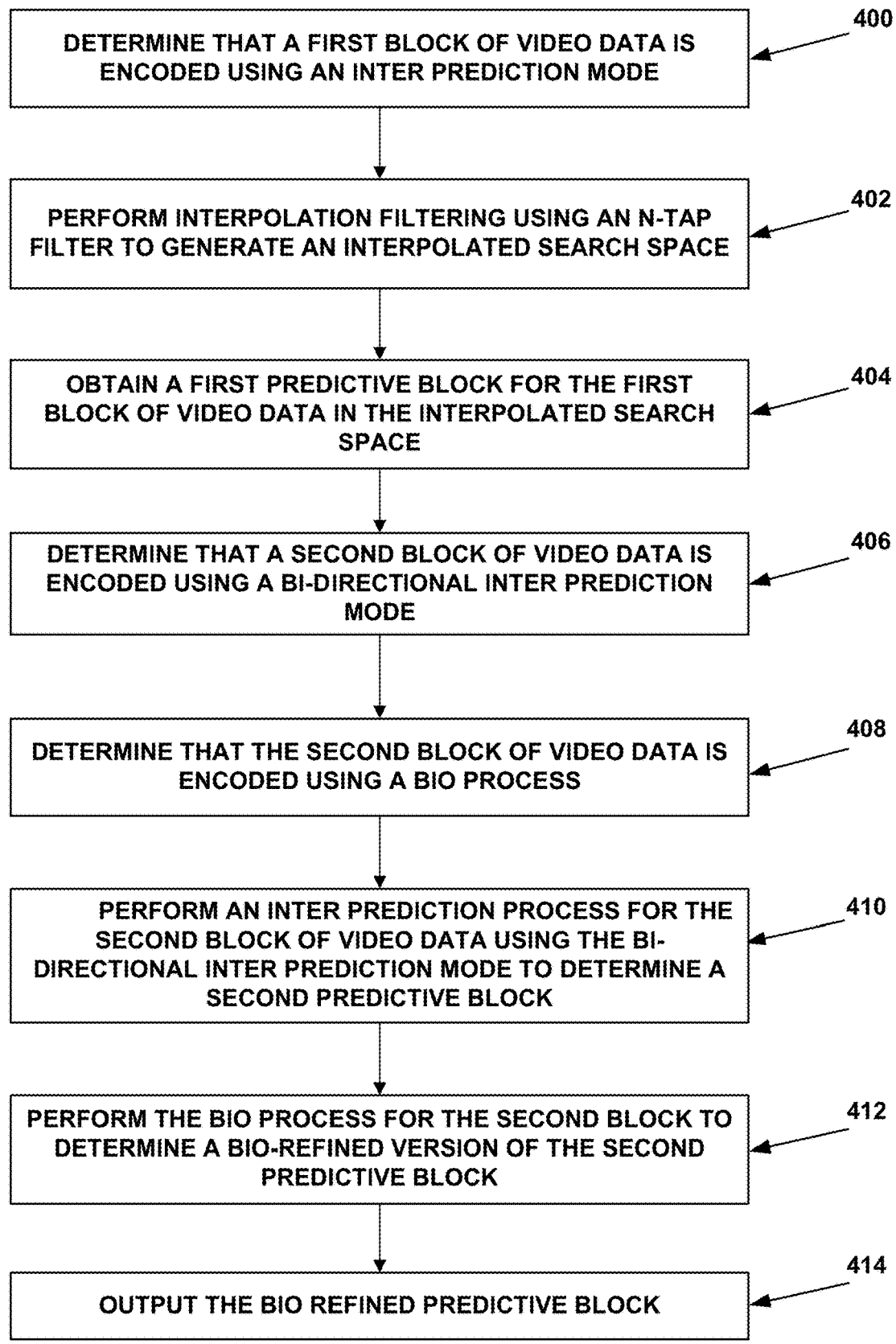
FIG. 23 is a flowchart illustrating an example method of decoding video data in accordance with techniques described in this disclosure.

FIG. 23 is a flow diagram illustrating an example video decoding technique described in this disclosure. The techniques of FIG. 23 will be described with reference to a video decoder, such as but not limited to video decoder 30. In some instances, the techniques of FIG. 23 may be performed by a video encoder such as video encoder 20, in which case the video decoder corresponds to the decoding loop of the video encoder.

In the example of FIG. 23, the video decoder determines that a first block of video data is encoded using an inter prediction mode (400). The video decoder performs inter-polation filtering using an N-tap filter to generate an interpolated search space (402). N is an integer and corresponds to a number of taps in the N-tap filter. The video decoder obtains a first predictive block for the first block of video data in the interpolated search space (404). The video decoder determines that a second block of video data is encoded using a bi-directional inter prediction mode (406). The video decoder determines that the second block of video data is encoded using a BIO process (408). The video decoder performs an inter predicts process for the second block of video data using the bi-directional inter prediction mode to determine a second predictive block (410). The video decoder performs the BIO process on the second predictive block to determine a BIO-refined version of the second predictive block (412). In some examples, a number of reference samples used for calculating intermediate values for BIO offsets can be limited to a region of (W+N−1)×(H+N−1) integer samples, where W corresponds to a width of the second block in integer samples and H corresponds to a height of the second block in integer samples.

The video decoder may, for example, perform the BIO process for the second block to determine a BIO-refined version of the second predictive block by fetching a block of reference samples corresponding to the region of (W+N−1)×(H+N−1) integer samples, generating an extended reference block with a size of (W+N−1+2S)×(H+N−1+2S) based on the block of reference samples, where S corresponds to a positive integer value, using sample values in the extended reference block, determining one or more BIO offsets, and adding the one or more BIO offsets to the block to determine the BIO-refined predictive block.

To generate the extended reference block with the size of (W+N−1+2S)×(H+N−1+2S) based on the block of reference samples, the video decoder may, for example, repeat a top row of the block of reference samples corresponding to the region of (W+N−1)×(H+N−1) integer samples and repeat a bottom row of the block of reference samples corresponding to the region of (W+N−1)×(H+N−1) integer samples. To generate the extended reference block with the size of (W+N−1+2S)×(H+N−1+2S) based on the block of reference samples, the video decoder may, additionally or alternatively, repeat a left row of the block of reference samples corresponding to the region of (W+N−1)×(H+N−1) integer samples and repeat a right row of the block of reference samples corresponding to the region of (W+N−1)×(H+N−1) integer samples.

In some examples, to generate the extended reference block with the size of (W+N−1+2S)×(H+N−1+2S) based on the block of reference samples, the video decoder may repeat a top row of the block of reference samples corresponding to the region of (W+N−1)×(H+N−1) integer samples, repeat a bottom row of the block of reference samples corresponding to the region of (W+N−1)×(H+N−1) integer samples, repeat a left row of the block of reference samples corresponding to the region of (W+N−1)×(H+N−1) integer samples, repeat a right row of the block of reference samples corresponding to the region of (W+N−1)×(H+N−1) integer samples, determine sample values for a top-left corner of the extended reference block based on sample values of the repeated top row and sample values of the repeated left row, determine sample values for a top-right corner of the extended reference block based on sample values of the repeated top row and sample values of the repeated right row, determine sample values for a bottom-left corner of the extended reference block based on sample values of the repeated bottom row and sample values of the repeated left row, and determine sample values for a bottom-right corner of the extended reference block based on sample values of the repeated top row and sample values of the repeated bottom row.

As illustrated above in the examples of FIGS. 11, 13-18, and 20-23, in some examples, the video decoder may apply an OBMC process to the second predictive block prior to performing the BIO process for the second block, or the video decoder may apply an OBMC process after applying the BIO process. If the video decoder applies the OBMC process after applying the BIO process, the video decoder may apply the OBMC process to the BIO refined predictive block.

The video decoder outputs the BIO refined version of the second predictive block (414). The BIO refined predictive block may undergo additional processing, such as an OBMC process and/or one or more loop filters, prior to being output.

In instances where the video decoder is part of a video encoder, then the video decoder may output the BIO refined predictive block by storing a decoded picture including the BIO refined predictive block in a decoded picture buffer for use as reference picture in encoding subsequent pictures of video data. In instances where the video decoder is decoding the video data for display, then the video decoder may output the BIO refined predictive block by storing a decoded picture including the BIO refined predictive block in a decoded picture buffer for use as a reference picture in decoding subsequent pictures of video data and by outputting the decoded picture including the BIO refined predictive block, possibly after further processing such as after applying one or more loop filters to the BIO refined predictive block, to a display device.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can be any of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer, or any combination thereof. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining that a first block of video data is encoded using an inter prediction mode;
    performing interpolation filtering using an N-tap filter to generate an interpolated search space, wherein N is an integer and corresponds to a number of taps in the N-tap filter;
    obtaining a first predictive block for the first block of video data in the interpolated search space;
    determining that a second block of video data is encoded using a bi-directional inter prediction mode;
    determining that the second block of video data is encoded using a bi-directional optical flow (BIO) process;
    performing an inter prediction process for the second block of video data using the bi-directional inter prediction mode to determine a second predictive block;
    performing the BIO process on the second predictive block to determine a BIO-refined version of the second predictive block, wherein a number of reference samples used for calculating intermediate values for BIO offsets is limited to a region of $(W+N-1)\times(H+N-1)$ integer samples, wherein W corresponds to a width of the second block in integer samples, and H corresponds to a height of the second block in integer samples, wherein performing the BIO process for the second block to determine the BIO-refined version of the second predictive block comprises:
        fetching a block of reference samples corresponding to the region of $(W+N-1)\times(H+N-1)$ integer samples;
        applying sample repetition at boundaries of the block of reference samples corresponding to the region of $(W+N-1)\times(H+N-1)$ to generate an extended reference block with a size of $(W+N-1+2S)\times(H+N-1+2S)$, wherein S corresponds to a positive integer value;
        using sample values in the extended reference block, determining one or more BIO offsets; and
        adding the one or more BIO offsets to the second predictive block to determine the BIO-refined version of the second predictive block; and
    outputting the BIO-refined version of the second predictive block.

2. The method of claim 1, wherein generating the extended reference block with the size of $(W+N-1+2S)\times(H+N-1+2S)$ based on the block of reference samples comprises:
    repeating a top row of the block of reference samples corresponding to the region of $(W+N-1)\times(H+N-1)$ integer samples; and
    repeating a bottom row of the block of reference samples corresponding to the region of $(W+N-1)\times(H+N-1)$ integer samples.

3. The method of claim 1, wherein generating the extended reference block with the size of $(W+N-1+2S)\times(H+N-1+2S)$ based on the block of reference samples comprises:
    repeating a left row of the block of reference samples corresponding to the region of $(W+N-1)\times(H+N-1)$ integer samples;
    repeating a right row of the block of reference samples corresponding to the region of $(W+N-1)\times(H+N-1)$ integer samples.

4. The method of claim 1, wherein generating the extended reference block with the size of $(W+N-1+2S)\times(H+N-1+2S)$ based on the block of reference samples comprises:
    repeating a top row of the block of reference samples corresponding to the region of $(W+N-1)\times(H+N-1)$ integer samples;
    repeating a bottom row of the block of reference samples corresponding to the region of $(W+N-1)\times(H+N-1)$ integer samples;
    repeating a left row of the block of reference samples corresponding to the region of $(W+N-1)\times(H+N-1)$ integer samples;
    repeating a right row of the block of reference samples corresponding to the region of $(W+N-1)\times(H+N-1)$ integer samples;
    determining sample values for a top-left corner of the extended reference block based on sample values of the repeated top row and sample values of the repeated left row;
    determining sample values for a top-right corner of the extended reference block based on sample values of the repeated top row and sample values of the repeated right row;
    determining sample values for a bottom-left corner of the extended reference block based on sample values of the repeated bottom row and sample values of the repeated left row;
    determining sample values for a bottom-right corner of the extended reference block based on sample values of the repeated top row and sample values of the repeated bottom row.

5. The method of claim 1, further comprising:
    applying an Overlapped Block Motion Compensation (OBMC) process to the second predictive block prior to performing the BIO process for the second block.

6. The method of claim 1, further comprising:
    applying an Overlapped Block Motion Compensation (OBMC) process to the BIO refined predictive block.

7. The method of claim 1, wherein the method for decoding the video data is performed as part of a reconstruction loop of a video encoding process.

8. The method of claim 1, wherein the number of reference samples used for calculating the intermediate values for BIO offsets is limited to the region of (W+N−1)×(H+N−1) integer samples such that the reference samples used for calculating the intermediate values for BIO offsets is limited to a same set of reference samples used for performing the interpolation filtering.

9. A device for decoding video data, the device comprising:
a memory configured to store the video data; and
one or more processors configured to:
determine that a first block of video data is encoded using an inter prediction mode;
perform interpolation filtering using an N-tap filter to generate an interpolated search space, wherein N is an integer and corresponds to a number of taps in the N-tap filter;
obtain a first predictive block for the first block of video data in the interpolated search space;
determine that a second block of video data is encoded using a bi-directional inter prediction mode;
determine that the second block of video data is encoded using a bi-directional optical flow (BIO) process;
perform an inter prediction process for the second block of video data using the bi-directional inter prediction mode to determine a second predictive block;
perform the BIO process on the second predictive block to determine a BIO-refined version of the second predictive block, wherein a number of reference samples used for calculating intermediate values for BIO offsets is limited to a region of (W+N−1)×(H+N−1) integer samples, wherein W corresponds to a width of the second block in integer samples, and H corresponds to a height of the second block in integer samples, wherein to perform the BIO process for the second block to determine the BIO-refined version of the second predictive block, the one or more processors are further configured to:
fetch a block of reference samples corresponding to the region of (W+N−1)×(H+N−1) integer samples;
apply sample repetition at boundaries of the block of reference samples corresponding to the region of (W+N−1)×(H+N−1) to generate an extended reference block with a size of (W+N−1+2S)×(H+N−1+2S), wherein S corresponds to a positive integer value;
use sample values in the extended reference block, determining one or more BIO offsets; and
add the one or more BIO offsets to the second predictive block to determine the BIO-refined version of the second predictive block; and
output the BIO-refined version of the second predictive block.

10. The device of claim 9, wherein to generate the extended reference block with the size of (W+N−1+2S)×(H+N−1+2S) based on the block of reference samples, the one or more processors are further configured to:
repeat a top row of the block of reference samples corresponding to the region of (W+N−1)×(H+N−1) integer samples; and
repeat a bottom row of the block of reference samples corresponding to the region of (W+N−1)×(H+N−1) integer samples.

11. The device of claim 9, wherein to generate the extended reference block with the size of (W+N−1+2S)×(H+N−1+2S) based on the block of reference samples, the one or more processors are further configured to:
repeat a left row of the block of reference samples corresponding to the region of (W+N−1)×(H+N−1) integer samples;
repeat a right row of the block of reference samples corresponding to the region of (W+N−1)×(H+N−1) integer samples.

12. The device of claim 9, wherein to generate the extended reference block with the size of (W+N−1+2S)×(H+N−1+2S) based on the block of reference samples, the one or more processors are further configured to:
repeat a top row of the block of reference samples corresponding to the region of (W+N−1)×(H+N−1) integer samples;
repeat a bottom row of the block of reference samples corresponding to the region of (W+N−1)×(H+N−1) integer samples;
repeat a left row of the block of reference samples corresponding to the region of (W+N−1)×(H+N−1) integer samples;
repeat a right row of the block of reference samples corresponding to the region of (W+N−1)×(H+N−1) integer samples;
determine sample values for a top-left corner of the extended reference block based on sample values of the repeated top row and sample values of the repeated left row;
determine sample values for a top-right corner of the extended reference block based on sample values of the repeated top row and sample values of the repeated right row;
determine sample values for a bottom-left corner of the extended reference block based on sample values of the repeated bottom row and sample values of the repeated left row;
determine sample values for a bottom-right corner of the extended reference block based on sample values of the repeated top row and sample values of the repeated bottom row.

13. The device of claim 9, wherein the one or more processors are further configured to:
apply an Overlapped Block Motion Compensation (OBMC) process to the second predictive block prior to performing the BIO process for the second block.

14. The device of claim 9, wherein the one or more processors are further configured to:
apply an Overlapped Block Motion Compensation (OBMC) process to the BIO refined predictive block.

15. The device of claim 9, wherein the device for decoding the video data comprises a device for encoding video data that performs video decoding as part of a reconstruction loop of a video encoding process.

16. The device of claim 9, wherein the device comprises a wireless communication device, further comprising a receiver configured to receive encoded video data.

17. The device of claim 16, wherein the wireless communication device comprises a telephone handset and wherein the receiver is configured to demodulate, according to a wireless communication standard, a signal comprising the encoded video data.

18. The device of claim 9, wherein the device comprises a wireless communication device, further comprising a transmitter configured to transmit encoded video data.

19. The device of claim 18, wherein the wireless communication device comprises a telephone handset and wherein the transmitter is configured to modulate, according to a wireless communication standard, a signal comprising the encoded video data.

20. The device of claim 8, wherein the number of reference samples used for calculating the intermediate values for BIO offsets is limited to the region of (W+N−1)×(H+N−1) integer samples such that the reference samples used for calculating the intermediate values for BIO offsets is limited to a same set of reference samples used for performing the interpolation filtering.

21. A non-transitory computer-readable storage medium storing instructions that when executed by one or more processors cause the one or more processors to:
  determine that a first block of video data is encoded using an inter prediction mode;
  perform interpolation filtering using an N-tap filter to generate an interpolated search space, wherein N is an integer and corresponds to a number of taps in the N-tap filter;
  obtain a first predictive block for the first block of video data in the interpolated search space;
  determine that a second block of video data is encoded using a bi-directional inter prediction mode;
  determine that the second block of video data is encoded using a bi-directional optical flow (BIO) process;
  perform an inter prediction process for the second block of video data using the bi-directional inter prediction mode to determine a second predictive block;
  perform the BIO process on the second predictive block to determine a BIO-refined version of the second predictive block, wherein a number of reference samples used for calculating intermediate values for BIO offsets is limited to a region of (W+N−1)×(H+N−1) integer samples, wherein W corresponds to a width of the second block in integer samples, and H corresponds to a height of the second block in integer samples, wherein to perform the BIO process for the second block to determine the BIO-refined version of the second predictive block, the instructions cause the one or more processors to:
    fetch a block of reference samples corresponding to the region of (W+N−1)×(H+N−1) integer samples;
    apply sample repetition at boundaries of the block of reference samples corresponding to the region of (W+N−1)×(H+N−1) to generate an extended reference block with a size of (W+N−1+2S)×(H+N−1+2S), wherein S corresponds to a positive integer value;
    use sample values in the extended reference block, determining one or more BIO offsets; and
    add the one or more BIO offsets to the second predictive block to determine the BIO-refined version of the second predictive block; and
  output the BIO-refined version of the second predictive block.

22. The non-transitory computer-readable medium of claim 21, wherein to generate the extended reference block with the size of (W+N−1+2S)×(H+N−1+2S) based on the block of reference samples, the instructions cause the one or more processors to:
  repeat a left row of the block of reference samples corresponding to the region of (W+N−1)×(H+N−1) integer samples;
  repeat a right row of the block of reference samples corresponding to the region of (W+N−1)×(H+N−1) integer samples.

23. The non-transitory computer-readable medium of claim 21, wherein to generate the extended reference block with the size of (W+N−1+2S)×(H+N−1+2S) based on the block of reference samples, the instructions cause the one or more processors to:
  repeat a top row of the block of reference samples corresponding to the region of (W+N−1)×(H+N−1) integer samples;
  repeat a bottom row of the block of reference samples corresponding to the region of (W+N−1)×(H+N−1) integer samples;
  repeat a left row of the block of reference samples corresponding to the region of (W+N−1)×(H+N−1) integer samples;
  repeat a right row of the block of reference samples corresponding to the region of (W+N−1)×(H+N−1) integer samples;
  determine sample values for a top-left corner of the extended reference block based on sample values of the repeated top row and sample values of the repeated left row;
  determine sample values for a top-right corner of the extended reference block based on sample values of the repeated top row and sample values of the repeated right row;
  determine sample values for a bottom-left corner of the extended reference block based on sample values of the repeated bottom row and sample values of the repeated left row;
  determine sample values for a bottom-right corner of the extended reference block based on sample values of the repeated top row and sample values of the repeated bottom row.

24. The non-transitory computer-readable medium of claim 21, wherein the instructions cause the one or more processors to:
  apply an Overlapped Block Motion Compensation (OBMC) process to the second predictive block prior to performing the BIO process for the second block.

* * * * *